United States Patent
Shiel

(10) Patent No.: US 9,869,481 B2
(45) Date of Patent: Jan. 16, 2018

(54) METHOD OF CONTROLLING VENTILATION AND CHILLING SYSTEMS TO CONSERVE ENERGY IN COMMERCIAL BUILDINGS

(71) Applicant: Patrick Andrew Shiel, Dublin (IE)

(72) Inventor: Patrick Andrew Shiel, Dublin (IE)

( * ) Notice: Subject to any disclaimer, the term of this patent is extended or adjusted under 35 U.S.C. 154(b) by 0 days.

(21) Appl. No.: 15/182,458

(22) Filed: Jun. 14, 2016

(65) Prior Publication Data

US 2016/0334122 A1    Nov. 17, 2016

Related U.S. Application Data

(63) Continuation-in-part of application No. 14/607,011, filed on Jan. 27, 2015, now Pat. No. 9,395,712.

(51) Int. Cl.
*G06F 19/00* (2011.01)
*F24F 11/00* (2006.01)
(Continued)

(52) U.S. Cl.
CPC ...... *F24F 11/0001* (2013.01); *F24D 19/1048* (2013.01); *F24D 19/1081* (2013.01); *F24F 11/006* (2013.01); *G05B 13/048* (2013.01); *G05B 15/02* (2013.01); *G05F 1/66* (2013.01); *G06N 99/005* (2013.01); *G06Q 10/04* (2013.01); *G06Q 10/06* (2013.01); *G06Q 50/06* (2013.01); *G06Q 50/16* (2013.01); *F24F 2011/0047* (2013.01); *F24F 2011/0058* (2013.01); *F24F 2011/0063* (2013.01); *F24F 2011/0064* (2013.01); *F24F 2011/0075* (2013.01); *G05B 2219/2614* (2013.01); *G06F 17/5004* (2013.01); *G06F 17/5009* (2013.01); *G06F 2217/80* (2013.01); *Y02B 30/767* (2013.01)

(58) Field of Classification Search
CPC ................ G06Q 10/04; H02J 2003/007; H02J 2003/003; G05B 2219/42001; Y02B 70/3225; Y02B 60/144; Y02B 70/3241
See application file for complete search history.

(56) References Cited

U.S. PATENT DOCUMENTS

| | | | |
|---|---|---|---|
| 7,451,017 B2* | 11/2008 | McNally | G06Q 50/06 700/275 |
| 8,014,880 B2* | 9/2011 | Samardzija | G05B 23/021 700/17 |

(Continued)

OTHER PUBLICATIONS

West et al., Re-examination of external temperature as a predictor of energy usage in buildings, Journal of Building Engineering, Sep. 2015, pp. 184-194.*

*Primary Examiner* — Darrin Dunn

(57) ABSTRACT

The invention provides a method to reduce the thermal energy used in a commercial building by use of thermal parameters which are derived from readily-available data both internal and external to the building. By deriving a statistical relationship for each of the OFVR—Overnight Forced Ventilation Rate—and DFAR—day-time forced air replacement—, based on the weather forecast, the invention provides controlling the time and duration for which the mechanical cooling system is to be turned off or disabled from supplying chilled water to the ventilation system, which in turn, supplies tempered fresh air to some of all of a selected commercial building.

2 Claims, 19 Drawing Sheets

(51) Int. Cl.
*G06Q 50/06* (2012.01)
*G05B 13/04* (2006.01)
*F24D 19/10* (2006.01)
*G05B 15/02* (2006.01)
*G05F 1/66* (2006.01)
*G06N 99/00* (2010.01)
*G06Q 10/04* (2012.01)
*G06Q 10/06* (2012.01)
*G06Q 50/16* (2012.01)
*G06F 17/50* (2006.01)

(56) References Cited

U.S. PATENT DOCUMENTS

| | | | |
|---|---|---|---|
| 8,977,405 B2 | 3/2015 | Shiel | |
| 2006/0009864 A1* | 1/2006 | Kranner | G05B 13/0265 700/28 |
| 2008/0082195 A1* | 4/2008 | Samardzija | G05B 23/021 700/109 |
| 2009/0287320 A1* | 11/2009 | MacGregor | G05B 17/02 700/29 |
| 2011/0231320 A1* | 9/2011 | Irving | G06Q 30/00 705/80 |
| 2011/0307109 A1* | 12/2011 | Sri-Jayantha | G06Q 10/04 700/291 |
| 2012/0095608 A1* | 4/2012 | Murakami | G06Q 10/04 700/291 |
| 2012/0323342 A1* | 12/2012 | MacArthur | G05B 17/02 700/29 |
| 2013/0245847 A1* | 9/2013 | Steven | G06Q 50/06 700/291 |
| 2013/0304269 A1* | 11/2013 | Shiel | G06Q 50/06 700/291 |
| 2013/0338839 A1* | 12/2013 | Rogers | G05D 23/1917 700/278 |
| 2014/0148963 A1* | 5/2014 | Ozog | G06Q 10/06 700/291 |
| 2014/0156085 A1* | 6/2014 | Modi | F24F 11/0012 700/276 |
| 2014/0202584 A1* | 7/2014 | Mathison | F17C 5/06 141/4 |
| 2015/0142368 A1 | 5/2015 | Shiel | |
| 2015/0198961 A1 | 7/2015 | Shiel | |
| 2015/0198962 A1 | 7/2015 | Shiel | |

* cited by examiner

| B1 Building Usage | Total electrical Power (kWh) | Total Natural Gas Usage (kWh) |
|---|---|---|
| Jan | 207,353 | 367,798 |
| Feb | 244,004 | 417,166 |
| Mar | 281,787 | 331,608 |
| Apr | 291,566 | 305,652 |
| May | 247,185 | 195,190 |
| Jun | 272,702 | 142,498 |
| Jul | 310,670 | 180,722 |
| Aug | 273,205 | 155,407 |
| Sep | 268,210 | 189,024 |
| Oct | 284,603 | 238,256 |
| Nov | 293,774 | 330,486 |
| Dec | 294,697 | 389,378 |
| Total | 3,269,756 | 3,243,185 |

Fig. 5

| B1 kWhr/m²/yr | CIBSE typical | CIBSE Good Practice | B1 Baseline |
|---|---|---|---|
| Heat | 210 | 114 | 347 |
| Electricity | 358 | 234 | 350 |

Fig. 7

| B1 Building Solar and cool-down Thermal Parameters | Model | Dependant Variable | Units |
|---|---|---|---|
| Natural thermal lag profile (NTLP) | NTL = 12.93 − 0.555Tout ± 1.9 | Daily average external temperature | 15 min periods |
| Night-time Natural Cool-down profile Slope (NNCPS) | NNCPS = −0.004 − 0.022ALaggedTout ± 0.012 | Daily average lagged external temperature | °F/hour |
| Overnight Forced Ventilation Rate (OFVR) | OFVR = 6.18 + 0.68ATout ± 0.19 | Daily average external temperature | °F/hour |
| Solar Gain Rate (SGR) | SGR = 69.3 + 0.231ATout ± 0.14 | Daily average external temperature | °F/hour |
| Daytime Forced Air Rate (DFAR) | DFAR = 16.1 − 0.73ATout ± 0.26 | Daily average external temperature | °F/hour |

Fig. 8

| Pilot Building P1 kWhr/m²/yr | CIBSE typical | CIBSE Good Practice | benchmark year | Year 1 | Year 2 | Year 3 |
|---|---|---|---|---|---|---|
| Heat | 210 | 114 | 347 | 159 | 88 | 109 |
| Electricity | 358 | 234 | 350 | 301 | 241 | 211 |

Fig. 11

| Building B1 | Pre-Efficiency Program | Post-Efficiency Program |
|---|---|---|
| Month | Total Electricity Usage (BM) | Total Electricity Usage |
| Jan | 207,353 | 176,047 |
| Feb | 244,004 | 162,647 |
| Mar | 281,787 | 162,764 |
| Apr | 291,566 | 163,730 |
| May | 247,185 | 164,220 |
| Jun | 272,702 | 150,155 |
| Jul | 310,670 | 177,270 |
| Aug | 273,205 | 162,086 |
| Sep | 268,210 | 160,435 |
| Oct | 284,603 | 170,557 |
| Nov | 293,774 | 168,027 |
| Dec | 294,697 | 160,111 |
| TOTAL | 3,269,756 | 1,978,048 |

Fig. 12

METHOD OF CONTROLLING VENTILATION AND CHILLING SYSTEMS TO CONSERVE ENERGY IN COMMERCIAL BUILDINGS

RELATED APPLICATIONS

This application is a continuation in part of U.S. application Ser. No. 14/607,011 by the same inventor, entitled Building energy usage reduction of automation of optimized plant operation times and sub-hourly building energy forecasting to determine plant faults, filed Jan. 27, 2015, publication number US 2015-0198962 A1. The entirety of application Ser. No. 14/607,011 is incorporated by reference as if fully set forth herein.

This application is also related to U.S. application Ser. No. 13/906,822, entitled Continuous Optimization Energy Reduction Process in Commercial Buildings, filed May 31, 2013, publication number 2013-0304269 A1, and where the entireties of publication number 2013-0304269 A1 is incorporated by reference as if fully set forth herein.

This application is also related to U.S. application Ser. No. 14/606,989, entitled Method for determining the unique natural thermal lag (NTL) of a building, filed Jan. 27, 2015, and where the entireties of publication number 2015-0198961 A1 is incorporated by reference as if fully set forth herein.

This application is also related to U.S. application Ser. No. 14/966,300, entitled Development of certain mechanical heat profiles and their use in an automated optimization method to reduce energy consumption in commercial buildings during the heating season, filed Dec. 11, 2015, and where the entireties of SHIEL006 is incorporated by reference as if fully set forth herein.

This application is also related to U.S. application Ser. No. 15/066,681, entitled Development of certain mechanical cooling profiles and their use in an automated optimization method to reduce energy consumption in commercial buildings during the cooling season, filed Mar. 10, 2016, and where the entireties of SHIEL007 is incorporated by reference as if fully set forth herein.

GOVERNMENT FUNDING

None

FIELD OF USE

The invention is useful in energy management, and more particularly in the field of energy management in commercial buildings.

BACKGROUND

Energy use analysis in commercial buildings has been performed for many years by a number of software simulation tools which seek to predict the comfort levels of buildings while estimating the energy use. The underlying principles of these tools concentrate on thermal properties of individual elements of the building itself, such as wall panels, windows, etc. The complexity and level of detail required to accurately simulate a commercial building often makes its' use prohibitive. The accuracy of such models has also been called into question in the research material. Following the construction and occupation of a new commercial building, the installed plant, such as boilers and air conditioning equipment, whose function is to provide suitable occupant comfort, is usually controlled by a building management system (BMS).

Through practical experience within the construction industry, it has become known that this plant is often over-sized and the use of the plant is often excessive. Common examples of this include plant operating for significantly longer than required including unoccupied weekends, heating and cooling simultaneously operating in the same areas due to construction or control strategy problems and issues with overheating and the use of cooling to compensate. Where the common problem of overheating occurs, the building envelope is quite efficient in dumping excess heat by radiation. In a similar manner, where buildings are over-cooled in summer, buildings are very effective in absorbing heat from the external environment to compensate. The utilization of this plant is not normally matched to the building envelope in which it operates and it is the intention to show how the method described in this document can help with this matching process.

Publication number 2013-0304269 A1 and publication number 2015-0198961 A1 teach a series of methods developed to provide a high-level view of thermal performance in a commercial building. This view is quick to implement and easily understood by facilities and maintenance staff. The methods facilitate a better understanding of the thermal performance of a building envelope, as constructed, and the interaction between this envelope and the building's heating and cooling plant, as installed. The thermal performance of the building envelope and how it interacts with the plant has been expressed as a series of time lags and profiles which are functions of external air temperature and solar activity. External temperature remains the most influential of the external weather parameters on energy usage. The lags and profiles have been developed to be derived from data which is readily available within modern conventional buildings.

BRIEF SUMMARY OF THE INVENTION

Following teachings in publication number 2013-0304269 A1, where the derivation of a building's natural thermal lag was presented, and publication number 2015-0198961 A1 where a less data intensive method to calculate the natural thermal lag was derived, the following is an explanation of how selective ventilation of a building can be used to reduce energy consumption, particularly in spring, summer and autumn. Fresh air is a requirement in all commercial buildings, and to ensure fresh air reaches all areas, the air is usually forced by fan power through air-handling units. Since fresh air is required all-year-round, the air is tempered to ensure it is delivered at a temperature suitable for the occupants. This means the air is often heated in winter and cooled in summer. The thermal load to provide heated or cooled fresh air at a rate of perhaps 9 liters/sec per occupant can be very substantial. (see Chartered Institute of Building Service Engineers, CIBSE—Guide A Environmental Design 2015). The objective is to ensure that warm air is passing through the building in winter and cool air in summer. At certain times of year (spring and autumn), it is possible to use outside air in its passive or untempered state, since it is just at the correct temperature for internal use. It is also possible to use overnight air temperatures to pre-cool buildings in summer. Based on a weather forecast, this specification describes how newly derived thermal profiles facilitate the accurate prediction of when these useful energy saving opportunities can be applied.

In the inventive method taught herein, two important thermal profiles are introduced: the first which predicts the rate at which overnight forced ventilation (Overnight Forced Ventilation Rate or OFVR) cools open spaces in a commercial building as a function of external temperature, and the second which predicts when outside air may be suitable for direct daytime use in place of tempered (heated or cooled) fresh air (Daytime Forced Air Replacement or DFAR). The specification also makes use of two earlier defined thermal profiles: night-time natural cool-down profile slope NNCPS (defined in SHIEL006—US pub. no. US-2016-0195887-A1) and Solar Gain Rate SGR (defined in SHIEL008). OFVR is likely to be an option for building operations during spring, summer and autumn. DFAR is likely to be an option during spring and autumn.

Overnight Forced Ventilation Rate

The Overnight Forced Ventilation Rate (OFVR) represents, over the course of one night during suitable times of year, but probably late spring, summer or early autumn, a statistical relationship describing how a series of internal space temperatures vary with the real-time external air temperature on a 15-minute interval basis, when using untempered forced ventilation. The purpose of this statistical relationship or model is to facilitate the prediction of when the outside air temperature might be suitable for overnight cooling of spaces within the commercial building, particularly during warm summer months. Cooling is usually delivered to these spaces by airflow which has been lowered in temperature by passing the air over a series of chilled water filled coils. Since chilling is usually electrically powered and expensive to run, being able to predict when this cooling function can be delivered by outside untempered air can potentially deliver substantial energy reduction.

The observed fall of internal space temperature during overnight periods when the external air temperature is suitably low, happens at the same time as the night-time natural cool-down occurs. For this reason, the cooling effects of the NNCPS must be separately accounted for. This is done by rate vector separation using the well-known trapezoidal or triangular methods. The separation of these two cooling influences facilitates the further prediction of the amount of required external air (the flowrate or fan speed) required to cool down the internal space.

The time of year when this energy reduction opportunity is available will depend in major part on the geographical location of the building.

Day-Time Forced Air Replacement

The day-time forced air replacement (DFAR) is a statistical model derived from observed data which helps to predict when suitable external air (temperature and relative humidity) is available to be used in place of chilled or tempered air during the day and/or during occupied hours. In other words, chilling may not be required while these favorable external environmental conditions exist. DFAR has been found to depend on the real-time external air temperature and the rate at which the building responds to solar gain (expressed in the Solar Gain Rate or SGR in SHIEL008). In most commercial buildings, from practical experience, even when these external environmental conditions exist, a chiller load persists which results in wasteful energy consumption.

While the forecast of external temperatures is used in the DFAR model to determine the extent and when external air can be used to cool a building during occupied hours, the direct effects of solar gain must also be taken into account. For this reason, the method used to derive the Solar Gain Rate in SHIEL008 is used to isolate the effects of the solar gain on internal space temperatures and it is then possible to examine both suitable or sensible external untempered air cooling and solar gain as two conflicting effects on internal space temperature, the combined result being possible to predict.

This invention teaches a method to reduce the thermal energy used in a commercial building by use of thermal parameters which are derived from readily-available data both internal and external to the building. By deriving a statistical relationship for each of the OFVR and DFAR, based on the weather forecast, it is possible to determine if, when and for how long the mechanical cooling system can be turned off or disabled from supplying chilled water to the ventilation system, which in turn, supplies tempered fresh air to some of all of the building in question.

BRIEF DESCRIPTION OF DRAWINGS

The drawings listed are provided as an aid to understanding the invention

DETAILED DESCRIPTION OF A PREFERRED EMBODIMENT OF THE INVENTION

Introduction

Figure 1:
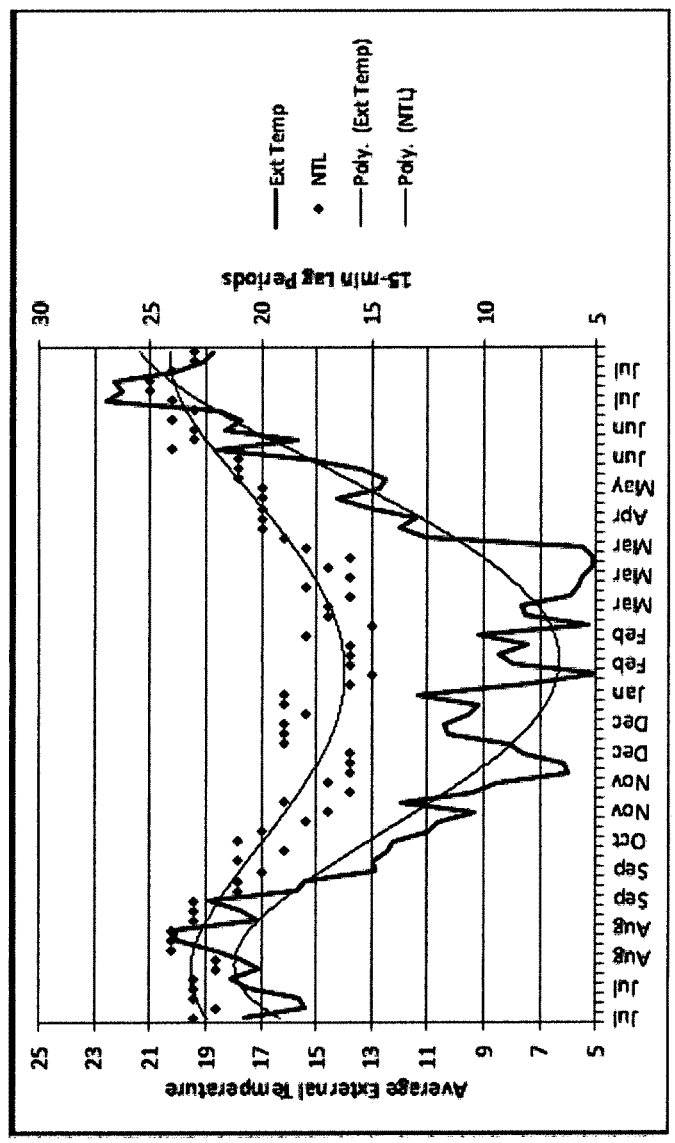
FIG. 1 Plot of test building B1 natural thermal lag as a function of external temperature. External temperature is shown for reference FIG. 2A Building space temperature profile prior to any efficiency interventions during the cooling season. Mechanical cooling enabled, occupancy and solar activity. A: Internal temperature rising appox 5 am; B: Ventilation system enabled 6.30 am; C: Occupancy and solar activity effects; D: Chiller pumps enabled 7.45 am FIG. 2B Building space temperature profile post efficiency program showing the use of the ventilation system used to pre-cool the building. Based on the weather forecast of external air temperatures and derived OFVR models, A: Ventilation system enabled 4 am—variable frequency drives operate air fans between 80% and 50%; B: First occupancy 7 am; C: Suitable external air temperatures until 9 am (below 65 F); D: Chiller unit enabled as Tsp nears 72 F 10.15 am, chiller pumps remain disabled; E: Chiller pumps enabled 11 am FIG. 3A Method 1 Inventive Process Steps 200-260
FIG. 3B Method 1 Inventive Process Steps 270-320
FIG. 3C Method 1 Inventive Process Steps 330-410
FIG. 3D Method 2 Inventive Process Steps 500-550
FIG. 3E Method 2 Inventive Process Steps 560-610
FIG. 3F Method 2 Inventive Process Steps 620-700
FIG. 4A Physical connections from building management system to plant and Modbus over IP
FIG. 4B—Inventive system connecting to the BMS Modbus over IP network
FIG. 5 B1 agreed energy baseline data
FIG. 6 Building space temperature profile during early and late cooling season showing the use of external air to replace chilled water cooling while external air temperatures are below the required limit of 69 F. A: External air temperature falls below 69 F at 15:00, chiller pumps are disabled; B: Slight rise in external temperatures, chiller pumps are re-enabled at 16:30
FIG. 7 B1 benchmark (BM) usage versus CIBSE usage ranges for heat and electricity
FIG. 8 B1 thermal profile statistical models derived from on-site and observed data
FIG. 9 Total heat delivered to B1—over a four year period with the commencement of the energy efficiency program indicated by A.
Figure 2A:
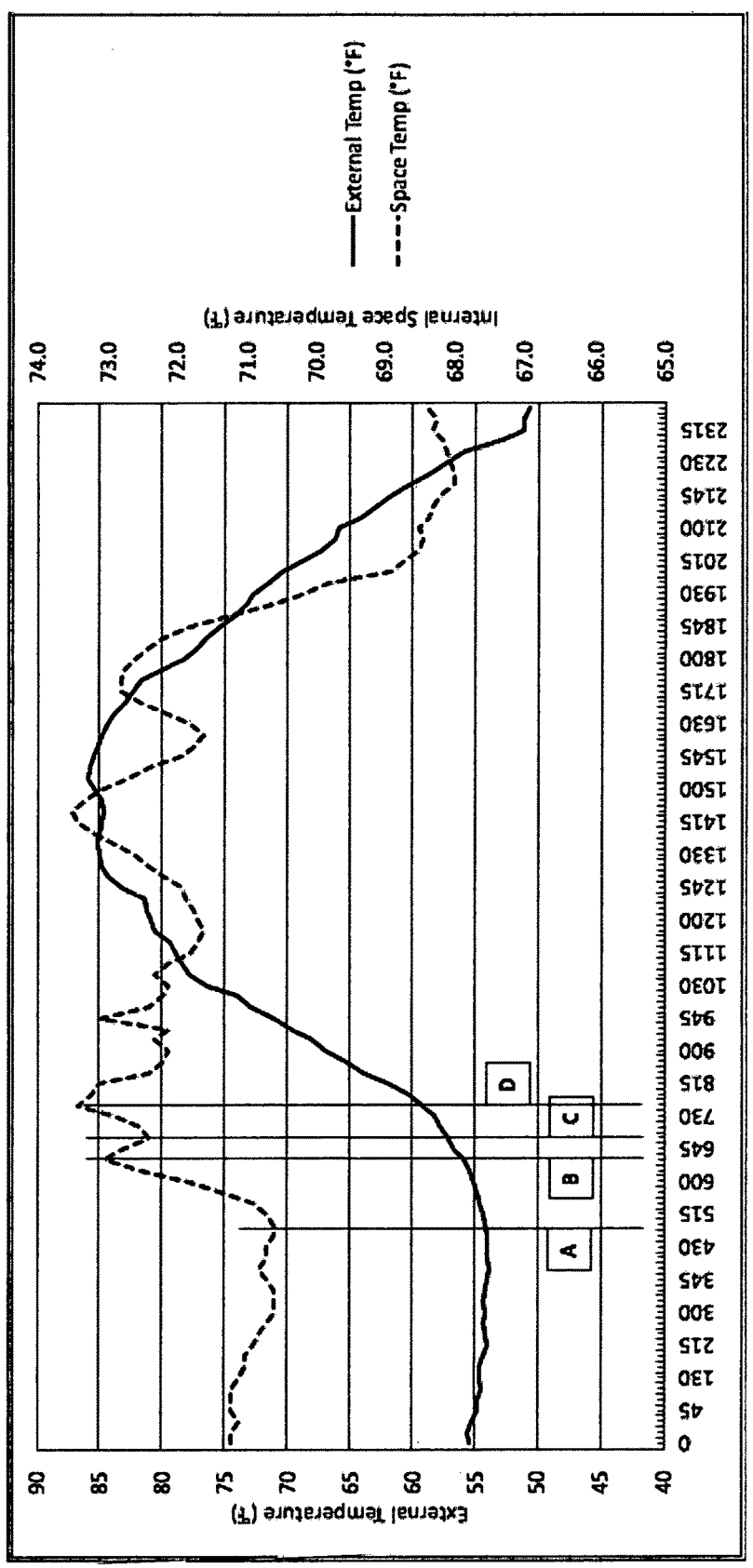
Figure 2B:
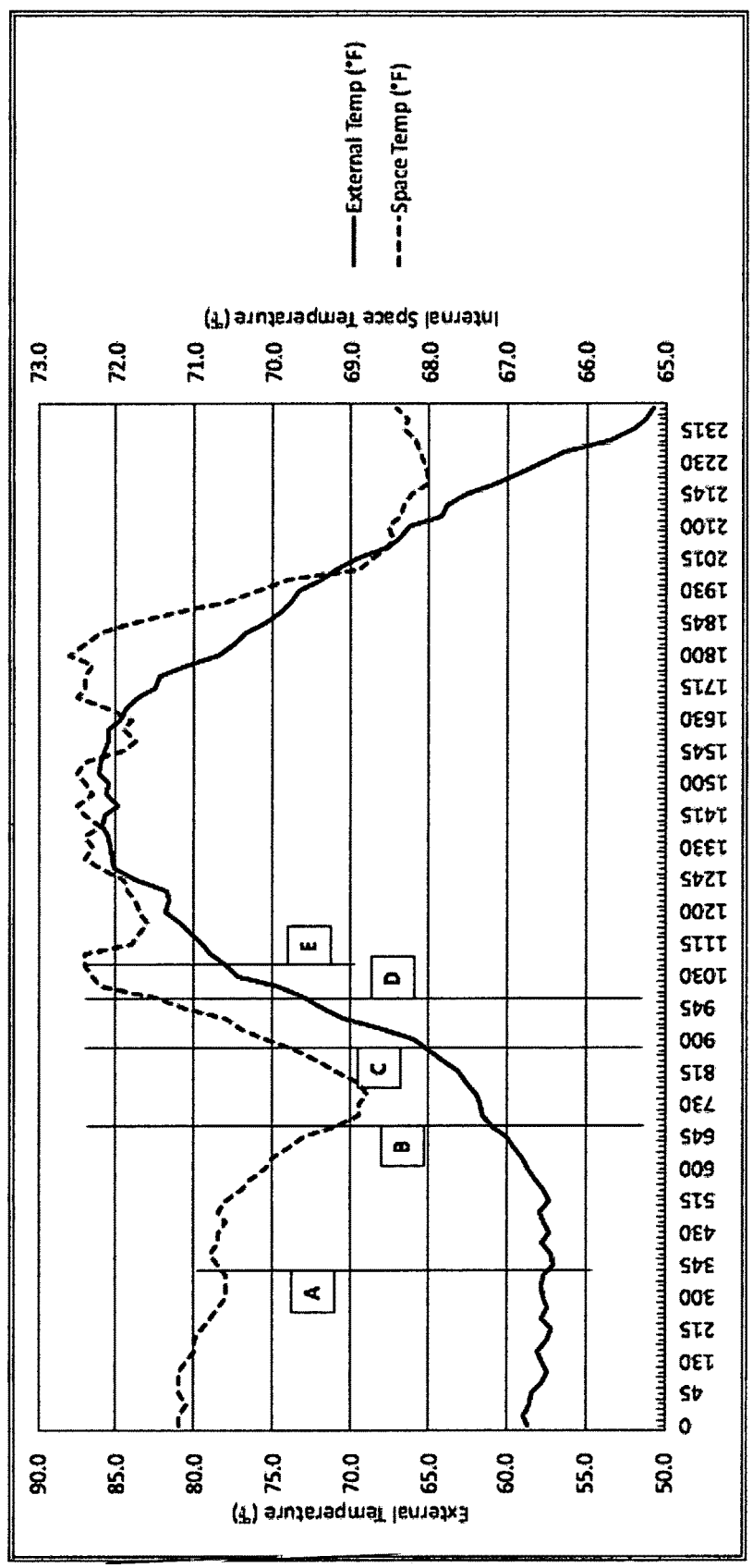

The invention is a computer system capable of connecting directly to a commercial building management system. The purpose of the invention computer system is to provide improved control of plant operations to enable significant energy savings in commercial buildings while providing desirable occupant comfort levels.

This section describes the introduction of two new thermal profiles, the manner in which these profiles along with the natural thermal lag described in publication number 2013-0304269 A1 and publication number 2015-0198961 A1 can be applied to the control of plant in a particular building, and finally, the application of these concepts to an actual building and the energy reduction results. Two new building specific thermal profiles are introduced and are referred to as the Overnight Forced Ventilation Rate (OFVR) and Day-time Forced Air Replacement (DFAR).

Following publication number 2013-0304269 A1, where the derivation of a building's natural thermal lag was presented, and publication number 2015-0198961 A1 where a less data intensive method to calculate the natural thermal lag was presented, the following is an explanation of how the natural thermal lag, along with a number of important thermal profiles, can be combined to achieve automated optimization of energy usage in commercial buildings. The following sections recap on how the natural thermal lag is derived in publication number 2013-0304269 A1 and publication number 2015-0198961 A1, and also shows the derivations of the overnight forced ventilation rate and the daytime forced air replacement. Both of these thermal parameters have been shown to be closely correlated to the average daily external temperature. Two further thermal profiles: night-time natural cool-down profile slope (NNCPS) and the solar gain rate (SGR), introduced in SHIEL006 and SHIEL008, respectively, are also used in this specification. The time lag evident in the derivation of the NNCPS is closely correlated with the building's unique natural thermal lag.

Natural Thermal Lag

The derivation of the building-unique natural thermal lag can be summarized as follows (from publication number 2013-0304269 A1 and publication number 2015-0198961 A1):

The natural thermal lag (NTL) of a commercial building is a unique property which indicates how quickly the internal spaces of the building respond to changes in external temperature. The NTL can be derived as follows:

a) using previously recorded data within said commercial building being 12 months of internal and external temperature data recorded at 15-minute intervals while the building was at rest, or in other words, the building was not in use, had no plant operating and experienced less than 1 hour of solar activity during the day in question (publication number 2013-0304269 A1). If internal temperature data is not available, the data used are energy consumption and external temperature data recorded at 15-minute intervals (publication number 2015-0198961 A1)

b) deriving the natural thermal lag (NTL) of said commercial building by applying the sum of squares method (outlined in publication number 2013-0304269 A1) on the 12 months of internal and external temperature data only on days when the building was at rest, where each value of NTL is calculated according to:

$$LagIndex_{LW} = \sum_{i=2p}^{p} (T_{S_i} - T_{O_{i-LW}})^2$$

wherein $LagIndex_{LW}$ is a sum of squares particular to a range of external temperatures indicated by a value LW, p is a number of 15 minute observations examined, $T_{S_i}$ is an internal space temperature at time period i, $T_{O_{i-LW}}$ is an outside temperature at LW periods prior to time period i If internal temperature is not available, apply the building energy to external temperature data regression analysis method as follows:

$$E_i = \beta_0 + \beta_1 (LT_i)_{k=0\ldots 8} + \epsilon_i$$

where $E_i$ represents average hourly energy usage for said building on day i, $\beta_0$ represents a Y axis intercept of a linear relationship between energy and lagged temperature average, $\beta_1$ represents a slope of a relationship between average hourly energy usage and a lagged temperature average $(LT_i)_{k=0\ldots 8}$ for a day i and ranging over a period k from 0 to 8 hours prior to a building closing time, $\epsilon$ is estimated variation The particular index of lagged average external temperature during the winter yields the low point of NTL sinusoid, while the particular index of lagged average external temperature during the summer yields the high point of the NTL sinusoid. This yields an approximated NTL plot over the full year (publication number 2015-0198961 A1).

c) Each NTL point (one for each day the building is at rest) can be plotted against the average external temperature recorded for that day. The relationship between the NTL and average daily external temperature can be established according to the regression equation:

$$NTL_i = \beta_0 - \beta_1 Tout_i + \epsilon_i$$

wherein $NTL_i$ is the natural thermal lag calculated on a particular day i $\beta_0$ is the intercept of the linear relationship between NTL and the average daily external temperature Tout on the y-axis $\beta_1$ is the slope of the linear relationship between NTL and the average daily external temperature Tout $Tout_i$ is the average daily external temperature calculated as the average of the 96 external temperature readings recorded during day i $\epsilon_i$ is the variability in the linear relationship Once the particular relationship between NTL and daily average external temperature is established for said commercial building, the NTL can be estimated for any given average daily external temperature.

Natural Thermal Lag Profile

Plotting the individual values of the natural thermal lag derived from data for each day the building is at-rest is indicated in FIG. 1. From FIG. 1, it is evident that the NTL is strongly related to the average daily external temperature. The strength of that relationship for this building can be examined by linear regression in which daily average outside temperature Tout$_i$ can be regressed against the observed NTL (based on results in publication number 2013-0304269 A1).

This relationship can be statistically modelled as a simple linear regression of:

$$NTL_i = \beta_0 - \beta_1 Tout_i + \epsilon_i$$

The actual model derived for the test building B1 is:

$$NTL = 12.93 - 0.555 Tout \pm 1.9$$

The parametric statistics which define this relationship are shown as an extract from the Minitab statistical analysis package:

| Regression Analysis: B1 NTL versus Average Tout |
| --- |
| The regression equation is<br>NTL = 12.93 + 0.5546 Average Tout<br>S = 0.851145  R-Sq = 91.7%  R-Sq(adj) = 91.6% |

Analysis of Variance

| Source | DF | SS | MS | F | P |
| --- | --- | --- | --- | --- | --- |
| Regression | 1 | 539.462 | 539.462 | 744.65 | 0.000 |
| Error | 67 | 48.538 | 0.724 | | |
| Total | 68 | 588.000 | | | |

This particular NTL response curve in FIG. 1 is defined by the high and low points. The curve remains consistently sinusoidal in following the pattern of average external temperatures from year to year. Therefore, it follows that if the high and low points are known, the annual NTL response curve can be estimated.

In publication number 2015-0198961 A1, it has been shown how energy usage data of winter heating and summer cooling can be used to determine the optimum value of NTL for these seasons without any reference to internal temperature data.

In fact, these values of NTL for summer and winter represent the highest and lowest points of the sinusoid and therefore a method to determine the year-long NTL response for this building has been developed, based on energy usage and external temperature data alone.

This facilitates the simple estimation of the building's unique NTL to be used for energy efficiency purposes, in the event that rapid estimation is required or that a full year of internal space temperature data is unavailable.

The overnight forced ventilation rate and the day-time forced air replacement are now defined. They are useful in determining the best start times for overnight ventilation plant operation and day-time cooling replacement times based on the external temperature profile contained in a weather forecast. This section shows how these two thermal parameters can be applied to ventilation plant operation times and are therefore used to reduce energy consumption in commercial buildings.

Overnight Forced Ventilation Rate

The Overnight Forced Ventilation Rate (OFVR) represents, over the course of several days of measurements, during late spring, summer or early autumn, a statistical relationship describing how a series of internal space temperatures varies with the real-time external air temperature on a 15-minute interval basis, while the building is being supplied with untempered external air via the fresh air system. During this overnight period, with the fresh air system running, but no heating or chilling, at least two possible cooling influences are acting on the internal space temperatures: (1) the natural cool-down of the building's internal spaces due to a falling external temperature and subsequent heat loss through the building envelope, and (2) the cooling effect of the cooler external air being supplied to spaces within the building by the fresh air system. These two influences are of interest in this specification. The natural cool-down (1) is captured by the NNCPS while the cooling effect of cooler external air (2) includes both the effect of the NNCPS and the effect of the fresh air supply. To determine the effect of supplying cooler fresh air overnight alone, the effect of the NNCPS must be subtracted.

The purpose of this statistical relationship or model is to facilitate the prediction of when the outside air temperature and humidity might make it suitable for untempered air to be used to provide overnight cooling of spaces within the commercial building, particularly during warm summer months. Since cooling is usually electrically powered, being able to predict when this cooling can be delivered by outside untempered air can potentially deliver substantial energy reduction. The time of year when this energy reduction opportunity is available will depend in major part on the geographical location of the building.

During the cooling season, when overnight external temperature is generally below 65° F. and relative humidity is below 60%, the fresh air ventilation system is enabled at a chosen time, say 5 am. It is also on interest to determine how much heating occurs of the fresh air as it passes through ductwork in the spring and autumn. This heat gain can be expressed in time as the building's natural ventilation lag and is a function of both average hourly external air temperature and the volume of fresh air being forced through the building's ductwork. For most modern ventilation systems, the volume of air is controllable with variable frequency drives (VFD) fitted to the supply fans. If a VFD is not fitted, it is now low cost and small effort to fit such devices. The speed at which the fan needs to operate is related to the external air temperature and therefore the fan speed is included in the linear regression relationship. This allows the optimization of fan power usage as a function of external air temperature.

From the ventilation system start time, internal and external data are collected and a regression model is derived to show how the internal space temperature changes as a function of the difference between that space temperature and the realtime external temperature. The objective is to get the entire building to an internal space temperature of approximately 68° F. at the time of occupation. This will feel very comfortable at 8 am during the cooling season. This process is repeated for any overnight when suitable external environmental conditions persist.

The VFD speed starts at 100% at the ventilation system ON time and is gradually lowered each 30 minutes, perhaps by 10% reduction, depending on the lowering of internal space temperatures. On each successive night and over time, during the cooling season, a profile is created of the required average fan speed, given the prevailing external air temperature. With the recorded temperature data, a regression relationship is derived by using an equation:

$$T_{SPi} = \beta_0 - \beta_1(T_{SPi} - Tout_i) + \epsilon_i \qquad \text{Eqn 1}$$

wherein $T_{SPi}$ is the internal space temperature recorded at time period i $\beta_0$ represents the intercept of the linear relationship between the internal space temperature and the difference between the internal space temperature and the external real-time temperature, on the y-axis $\beta_1$ represents the slope of the relationship between the internal space temperature $T_{SPi}$ and the difference between that temperature and the real-time temperature $Tout_i$ at time period i $Tout_i$ is the value of real-time external temperature, observed for any given time period i $\epsilon$ represents the variability in the linear model The slope of this linear relationship $\beta_1$ is the OFVR for this particular overnight period. By deriving several values of OFVR, one for each day, and recording the average daily real-time external temperature during the same periods, a predictive relationship can be formed which indicates how the OFVR will vary as a function of daily average real-time external temperature and variable frequency drive speed. This yields a series of $OFVR_{i=1\ldots N}$ values for heating days 1 . . . N. This is shown in generalized form as follows:

$$OFVR_i = \beta_0 - \beta_1 ATout_i + \beta_2 AVFD_i + \epsilon_i \qquad \text{Eqn 2}$$

wherein $OFVR_i$ is the derived overnight forced ventilation rate on any given day i, on which the cooling system is operating $\beta_0$ represents the intercept of the linear relationship between OFVR and daily average real-time external temperature on the y-axis and variable frequency drive speed on the z-axis $\beta_1$ represents the slope in the Y-direction of the plane forming the multiple linear regression relationship between the two predictors $ATout_i$ and $AVFD_i$ and the response $OFVR_i$ $\beta_2$ represents the slope in the Z-direction of the plane forming the multiple linear regression relationship between the two predictors $ATout_i$ and $AVFD_i$ and the response $OFVR_i$ $ATout_i$ represents the value of daily average real-time external temperature calculated for any given day i $AVFD_1$ represents the value of daily average variable frequency drive fan speed calculated for any given day i $\epsilon$ represents the variability in the linear model In SHIEL006, the night-time natural cool-down profile slope or NNCPS was described and applied to data collected in buildings during the heating season. The same general method can also be applied to data collected during the cooling season. Depending on geographical location, the cooling systems in buildings will probably run from mid-spring to mid-autumn. There may be a period during the height of summer when overnight natural cooling is not an option, given times when the overnight external temperature is higher than 65° F. This is particularly true in locations such as the Middle East and in certain southern Europe countries and US states. However, the principles described in this specification will certainly apply during spring and autumn, and these are sufficiently long periods to warrant their inclusion as part of an energy reduction program.

During periods when the external conditions are suitable, as described earlier, internal and external temperature data are recorded and the NNCPS algorithm is applied. This algorithm facilitates the prediction of how the overnight external temperature alone uniquely influences the internal space temperatures of any given building, while using the weather forecast of external temperatures. It is of particular interest to determine what the NNCPS model predicts will happen the internal space temperatures from the time the forced ventilation starts to the time of building occupation. The resulting thermal vector is simply subtracted from the equivalent OFVR thermal vector described above, to yield a resultant vector which is the effect of forced ventilation alone.

The two thermal vectors of NNCPS and OFVR must be derived from data recorded on two different nights. The separation of the vectors allows for the enhanced control of ventilation systems which have variable frequency drives installed. The cooler the external air, the slower the ventilation system can be run and it is possible to determine this slower fan speed in advance from the vectors which are both functions of external temperature. The objective is to get the building to the desired space temperature at the time of first occupation while having little or no chiller operation.

Invention Method 1

Figure 3A:
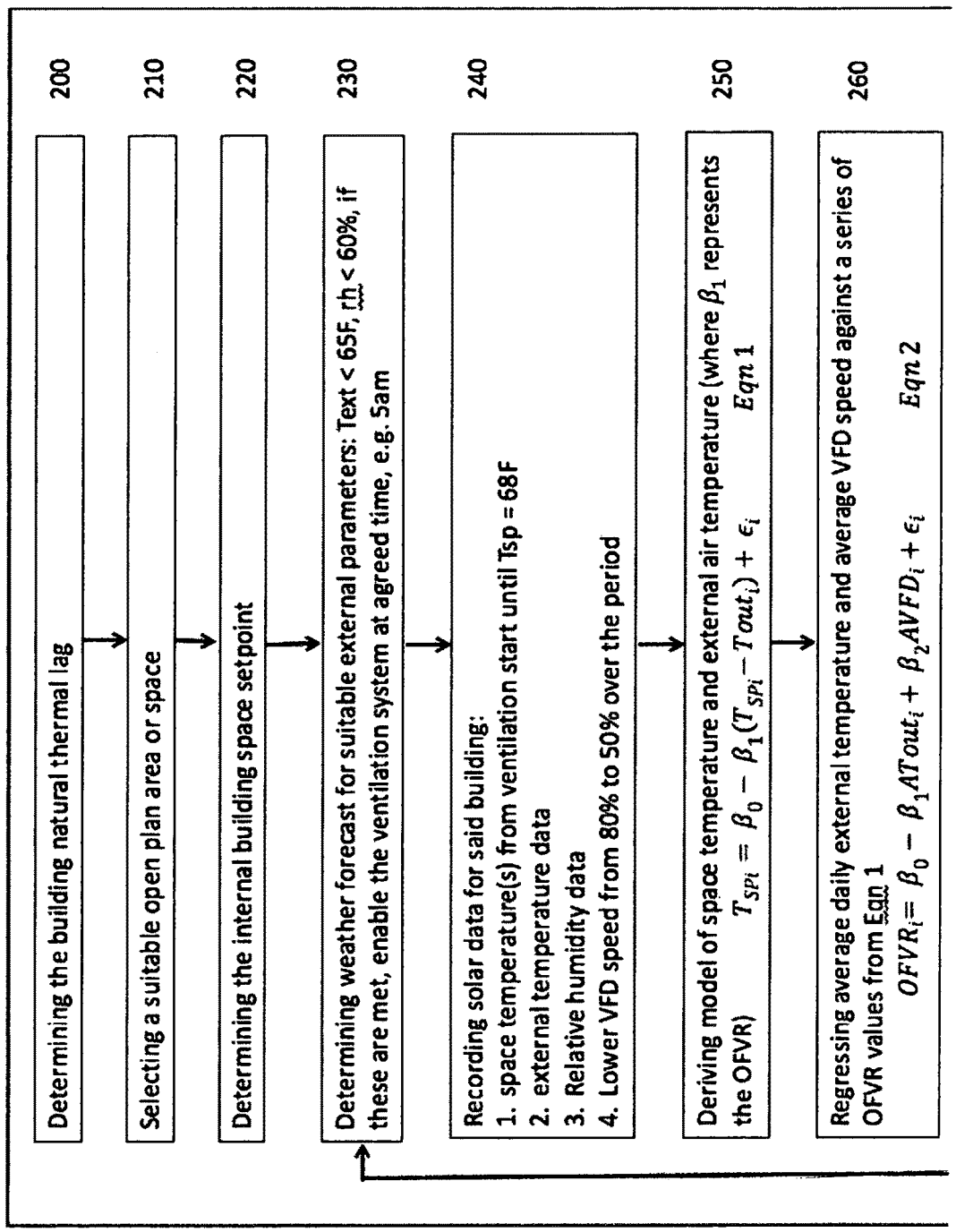
Figure 3B:
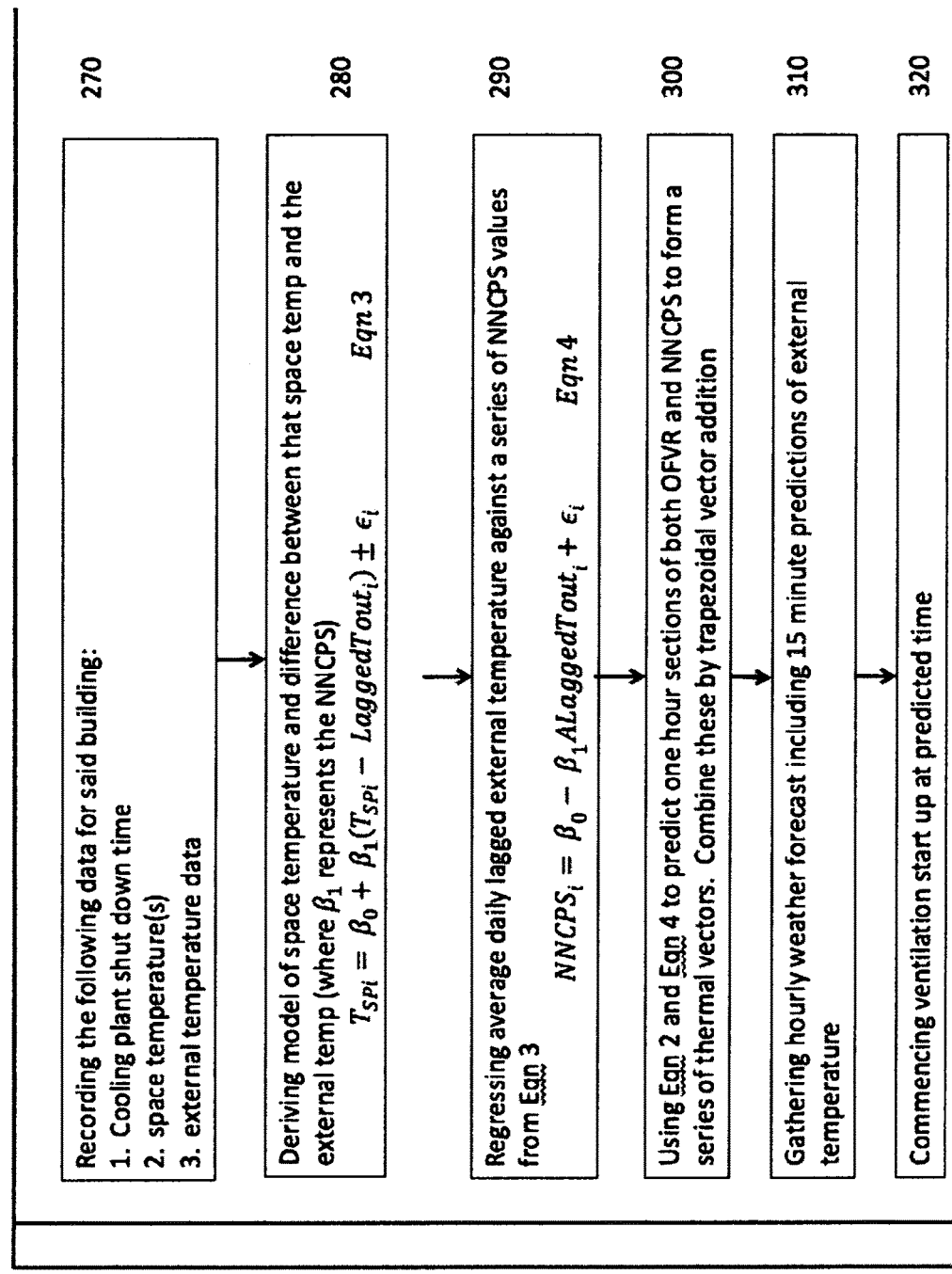
Figure 3C:
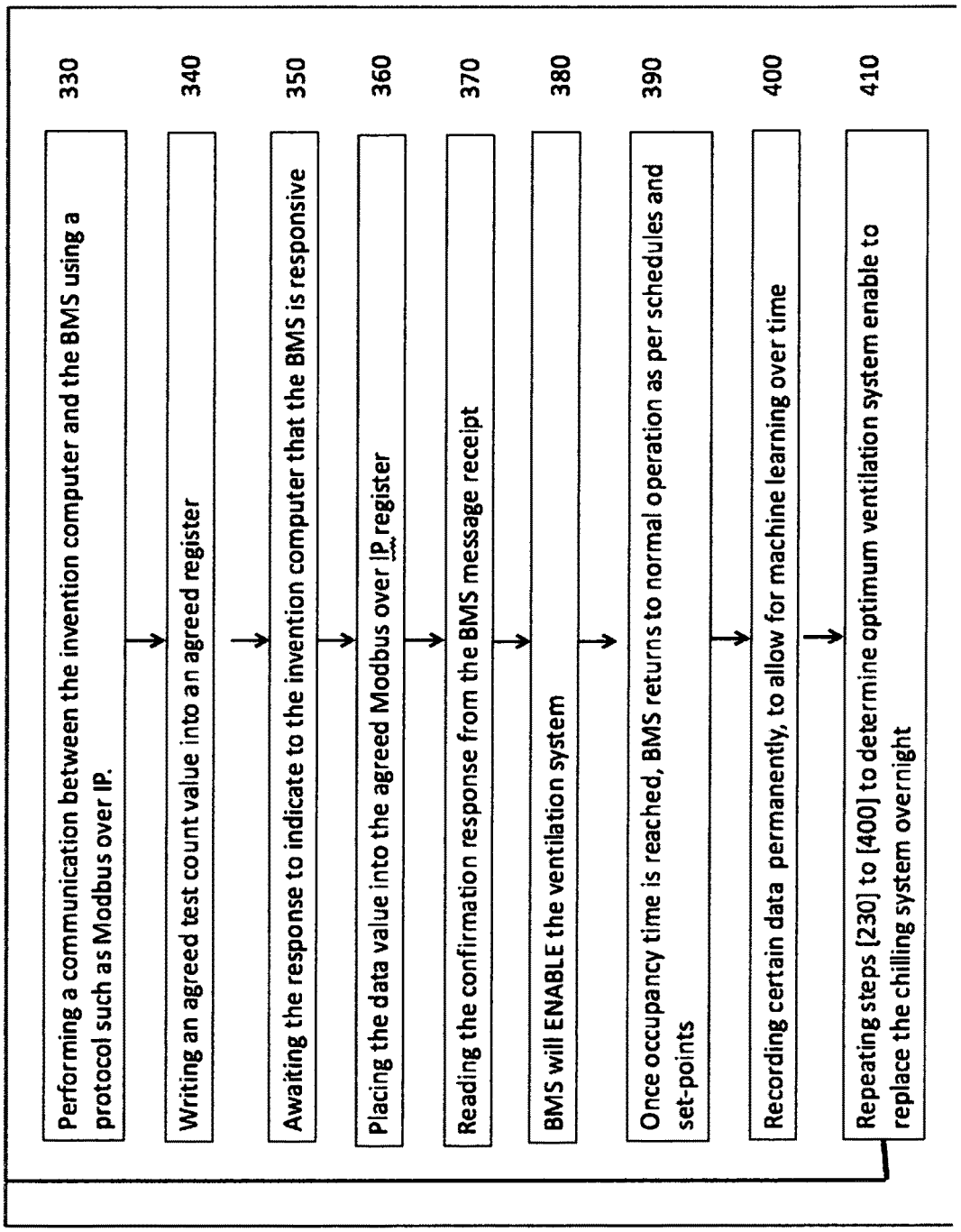

Method 1 steps are outlined in FIGS. 3A to 3C and are explained in the following section.

Method to determine suitable periods of overnight forced ventilation for space cooling prior to times of occupancy a) Determining [200] the building natural thermal lag by the means shown—these have shown in the preceding sections. Two methods exist and which one is used is determined by the data available. The methods to derive the natural thermal lag are more fully explained in U.S. Pat. No. 8,977,405 and in U.S. Pat. No. 9,317,026.

b) Selecting [210] a suitable open plan area or space within a selected commercial building or a series of suitable open spaces in which to observe the space temperature(s);

c) Determining [220] the internal building space set-point for the current cooling season. This is usually set at approximately 70-72° F. This is simply read off the building management system computer screen d) Determining [230] suitable (from weather forecast) overnight periods when the external temperature is generally below 65° F. with relative humidity of less than 60%. Enable the operation of the ventilation system at some agreed time, say 5 am e) Recording [240] the following data by observation during this ventilation system operating period in the said building:
  1. space temperature(s) for the chosen open plan location(s) in 15 minute intervals from the time of ventilation system start-up until the space temperatures reach an average of 68° F.
  2. simultaneous real-time external temperature in 15 minute intervals
  3. relative humidity in 15 minute intervals to ensure no higher than 60%
  4. lowering variable frequency drive speed every 30 minutes over the period from ventilation system start to time of occupation—this is averaged and recorded f) Deriving [250], using this recorded data when forced ventilation is enabled, a regression model to show how the internal space temperature changes as a function of the difference between that space temperature and the real-time external temperature for each cooling day using an equation:

$$T_{SPi} = \beta_0 - \beta_1(T_{SPi} - Tout_i) + \epsilon_i \qquad \text{Eqn 1}$$

wherein $T_{SPi}$ is the internal space temperature recorded at time period i $\beta_0$ represents the intercept of the linear relationship between the internal space temperature and the difference between the internal space temperature and the external real-time temperature, on the y-axis $\beta_1$ represents the slope of the relationship between the internal space temperature $T_{SPi}$ and the difference between that temperature and the real-time temperature $Tout_i$ at time period i $Tout_i$ is the value of real-time external temperature, observed for any given time period i $\epsilon$ represents the variability in the linear model g) Recording [260] the slope of Eqn 1 $\beta_1$ is the OFVR for this particular overnight period. For each overnight observed, a predictive relationship can be formed which indicates how the OFVR will vary as a function of daily average real-time external temperature and average variable frequency drive speed. This yields a series of $OFVR_{i=1 \ldots N}$ values for heating days 1 ... N. This is shown in generalized form as follows:

$$OFVR_i = \beta_0 - \beta_1 ATout_i + \beta_2 AVFD_i + \epsilon_i \quad \text{Eqn 2}$$

wherein $OFVR_i$ is the derived overnight forced ventilation rate on any given day i, on which the cooling system is operating $\beta_0$ represents the intercept of the linear relationship between OFVR and daily average real-time external temperature on the y-axis and variable frequency drive speed on the z-axis $\beta_1$ represents the slope in the Y-direction of the plane forming the multiple linear regression relationship between the two predictors $ATout_i$ and $AVFD_i$ and the response $OFVR_i$ $\beta_2$ represents the slope in the Z-direction of the plane forming the multiple linear regression relationship between the two predictors $ATout_i$ and $AVFD_i$ and the response $OFVR_i$ $ATout_i$ represents the value of daily average real-time external temperature calculated for any given day i $AVFD_i$ represents the value of daily average variable frequency drive fan speed calculated for any given day i $\epsilon$ represents the variability in the linear model h) Recording [270] the following data from the building management system computer screens and physically verified during the night-time natural cool-down phase in the evening for said building by recording:
1. cooling plant shut-down time
2. space temperature(s) for the chosen open plan location(s) at this shut-down time (usually 70-72° F.)
3. Space temperature(s) for the chosen open plan location(s) at the time when cooling usually starts the following morning
4. external temperature data in 15 minute intervals i) Deriving [280], using this recorded data, a regression model to show how the internal space temperature changes as a function of the difference between that space temperature and the lagged external temperature for each cooling day using an equation:

$$T_{SPi} = \beta_0 - \beta_1 (T_{SPi} - LaggedTout_i) + \epsilon_i \quad \text{Eqn 3}$$

wherein $T_{SPi}$ is the internal space temperature recorded at time period i $\beta_0$ represents the intercept of the linear relationship between the internal space temperature and the difference between the internal space temperature and the external lagged temperature, as guided by the NTL for this time of year, on the y-axis represents the slope of the relationship between the internal space temperature $T_{SPi}$ and the difference between that temperature and the external lagged temperature $LaggedTout_i$ at time period i $LaggedTout_i$ is the value of lagged external temperature, as guided by the NTL for this time of year, observed for any given time period i $\epsilon$ represents the variability in the linear model j) Determining [290] the night natural cool-down profile slope (NNCPS) on days the cooling system is operating, to help estimate the starting point for the internal space temperature at cooling start time for each day on which the cooling is operating, repeat the process outlined in g), recording each average daily lagged external temperature and the slope of the regression relationship pertaining to that particular day, $\beta_1$ or NNCPS. In this regression model (Eqn 3), the slope $\beta_1$ will be referred to as the NNCPS.

This yields a series of $NNCPS_{i=1 \ldots N}$ values for cooling days 1 ... N. A relationship can be established which links the NNCPS to the average daily average lagged external temperature and this is shown in generalized form in Eqn 4:

$$NNCPS_i = \beta_0 - \beta_1 ALaggedTout_i + \epsilon_i \quad \text{Eqn 4}$$

wherein $NNCPS_i$ is the derived night-time natural cool-down profile slope on any given day i, on which the cooling system is operating $\beta_0$ represents the intercept of the linear relationship between NNCPS and daily average lagged external temperature as guided by the natural thermal lag on the y-axis $\beta_1$ represents the slope of the relationship between $NNCPS_i$ and daily lagged average external temperature $ALaggedTout_i$ $ALaggedTout_i$ represents the value of daily average lagged external temperature guided by the natural thermal lag calculated for any given day i $\epsilon$ represents the variability in the linear model k) Using [300] the relationships formed in Eqn 2 and Eqn 4, take the predicted rise and/or fall of internal space temperature(s) during the period when the ventilation system is operational to form two resulting thermal vectors. Apply either the trapezoidal or triangular method of vector subtraction to yield a prediction of how the building space temperatures will respond due to overnight forced ventilation alone l) Gathering [310] the hourly weather forecast to include 15 minute predictions of external temperature for the following 8-12 hours, ensuring the forecast extends beyond the estimated natural thermal lag of the commercial building in question during the cooling season. Using this forecast in conjunction with Eqns 1-4 to predict a suitable start-up time and fan speed for the ventilation system to ensure correct space temperatures in the building at the time of first occupancy m) Commencing [320] ventilation system start-up at the predicted time n) Performing [330] a communication between the invention computer and the BMS using a protocol such as Modbus over IP to enable the ventilation system. For example, if the hex value of 0x1010 represents 'Ventilation system ENABLE' if placed in Modbus register 8056, as agreed with the BMS programmer o) Writing [340] an agreed test count value into an agreed register to ensure the BMS knows the invention computer is present and functional p) Awaiting [350] the response from the BMS, to indicate to the invention computer that the BMS is responsive q) Placing [360] the 0x1010 data value into the agreed Modbus over IP protocol register at the calculated ventilation system on time r) Reading [370] the confirmation response from the BMS in another register to confirm to the invention computer that the instruction to enable the ventilation system has been received s) Responding [380] to this writing of digital data (0x1010) into this register (8056), the BMS will turn the ventilation system on t) Depending [390] on the results of the vector combination explained in step 300, it has been determined that the ventilation system may be enabled for some period to avoid using the chiller. Once the building reaches occupation time, when solar activity, lighting and occupant effects may cause a rise in space temperature, the operation of the building's plant will return to normal set-points and schedules u) Recording [400] permanently, the observed 15-minute interval data for weather forecast, internal space temperatures and all other relevant data used in the above equations to facilitate more accuracy in the data regression models, to effectively allow for machine learning over time v) Repeating [410] steps d) 230 to u) 400 at an appropriate time, as calculated, to determine an optimum ventilation system early morning enable time during the cooling season.

Day-Time Forced Air Replacement

During the early and late parts of the cooling season, it is generally accepted that tempered fresh air should be supplied just below the desired internal space temperature set-point. Anything cooler might be noticeably cold. This supply temperature can be lowered at the height of summer, given occupants may wish for a cooler temperature. If external air is forced through ductwork in any part of the cooling season, it will likely heat up. The extent to which this heat-up occurs, is very dependent on external air temperature and solar activity and how these affect the building's façade and internal surfaces. For the purpose of this specification, it is assumed that in early and late parts of the annual cooling season, daytime external air temperatures are often below 66° F. and this is certainly true in parts of the US and Europe. From practical experience, it is also assumed that during these periods, the ductwork heat-up of forced air will add between 3° F. and 5° F. to the air volume's temperature. This would imply that external untempered air with a temperature of less than or about 66° F. with relative humidity of less that 60% would be suitable to use directly in buildings where the desired internal space temperature is about 71-72° F.

The day-time forced air replacement (DFAR) is a model derived from observed data which helps to predict when suitable external air (temperature and relative humidity) is available to be used in place of chilled or tempered air. In other words, chilling is not required while these favorable external environmental conditions exist. In most commercial buildings, from practical experience, even when these external environmental conditions exist, a chiller load persists which results in wasteful energy consumption.

While the forecast of external temperatures is used in the DFAR model to determine the extent and when external air can be used to cool a building during occupied hours, the direct effects of solar gain must also be taken into account. For this reason, the method used to derive the Solar Gain Rate in SHIEL008 is used to isolate the effects of the solar gain on internal space temperatures and it is then possible to examine both suitable external untempered air cooling and solar gain as two conflicting effects on internal space temperature, the combined result being possible to predict.

This invention represents a method to reduce the electrical energy used in a commercial building by use of thermal parameters which are derived from readily-available data, both internal and external to the building. By deriving a statistical relationship for each of the DFAR and SGR from observed data, then based on the weather forecast, it is possible to determine if, when and for how long the mechanical cooling system can be turned off or disabled from supplying chilled water or air to some of all of the building in question.

During periods of suitable external environmental conditions, as just described, disable the chiller pumps supplying chilled water to the air handling units or ventilation units. Internal and external data are collected and a regression model is derived to show how the internal space temperature changes as a function of the difference between that space temperature and the realtime external temperature.

This process is repeated for any daytime when suitable external environmental conditions persist. With the recorded temperature data, a regression relationship is derived by using an equation:

$$T_{VSPi} = \beta_0 - \beta_1(T_{VSPi} - Tout_i) + \epsilon_i \qquad \text{Eqn 5}$$

wherein $T_{VSPi}$ is the ventilated internal space temperature recorded at time period i $\beta_0$ represents the intercept of the linear relationship between the ventilated internal space temperature and the difference between the ventilated internal space temperature and the external real-time temperature, on the y-axis $\beta_1$ represents the slope of the relationship between the ventilated internal space temperature $T_{VSPi}$ and the difference between that temperature and the real-time temperature $Tout_i$ at time period i $Tout_i$ is the value of real-time external temperature, observed for any given time period i $\epsilon$ represents the variability in the linear model The slope of this linear relationship $\beta_1$ is the DFAR for this particular daytime period. The slope is recorded for each hour. By deriving several values of DFAR, perhaps one or several or each day, and recording the average daily real-time external temperature during the same periods, a predictive relationship can be formed which indicates how the DFAR will vary as a function of daily average real-time external temperature. This yields a series of $DFAR_{i=1 \ldots N}$ values for one hour periods 1 ... N when untempered forced air ventilation has replaced chilled air cooling. This is shown in generalized form as follows:

$$DFAR_i = \beta_0 - \beta_1 ATout_i + \epsilon_i \qquad \text{Eqn 6}$$

wherein $DFAR_i$ is the derived daytime forced air replacement on any given hour long period i, on which the cooling system is usually operating, but is replaced by untempered forced air ventilation β₀ represents the intercept of the linear relationship between DFAR and daily average real-time external temperature on the y-axis β₁ represents the slope of the relationship between $DFAR_1$ and daily lagged average external temperature $ALaggedTout_i$ $ALaggedTout_i$ represents the value of daily average lagged external temperature guided by the natural thermal lag calculated for any given day i ε represents the variability in the linear model Invention Method 2

Figure 3D:
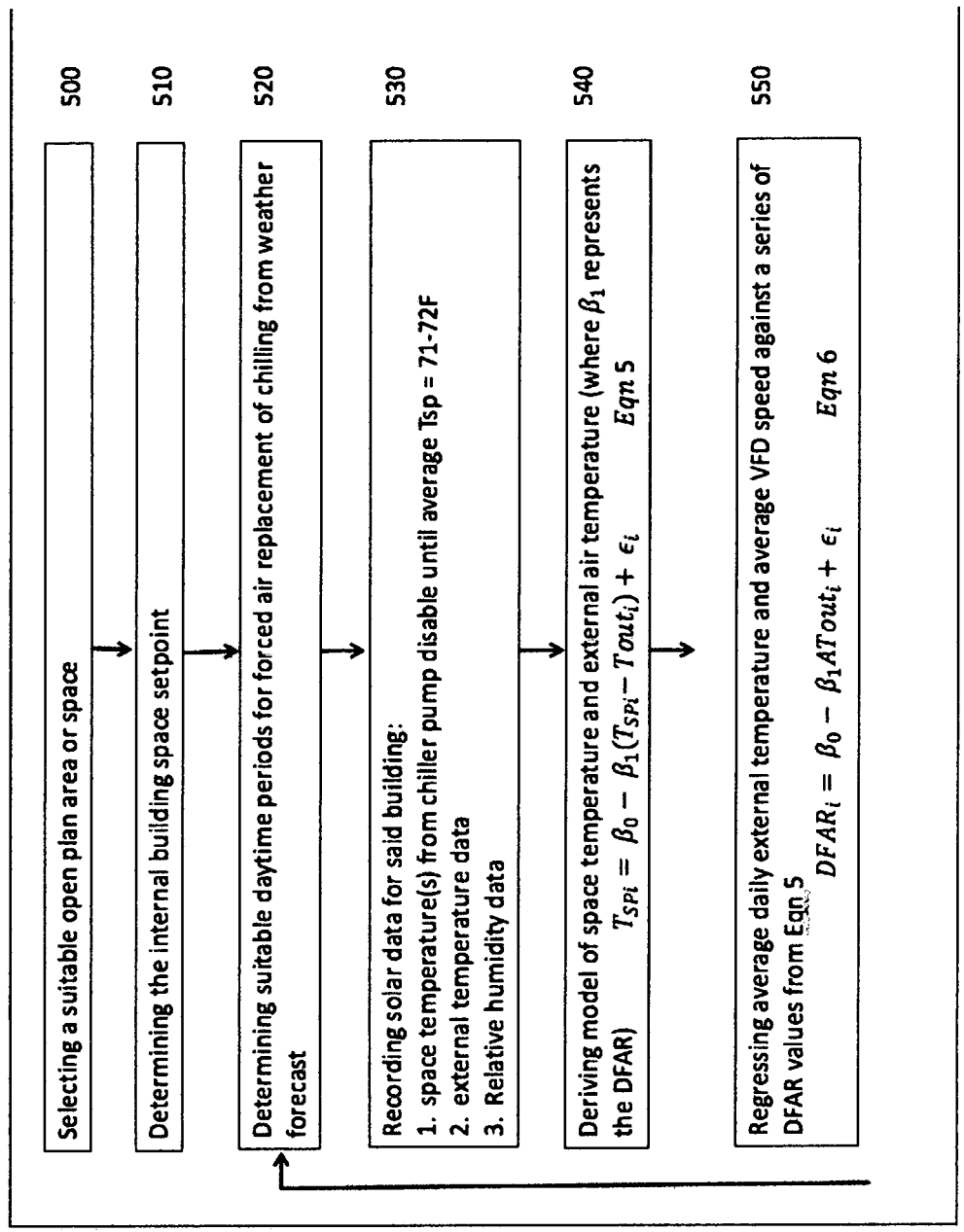
Figure 3E:
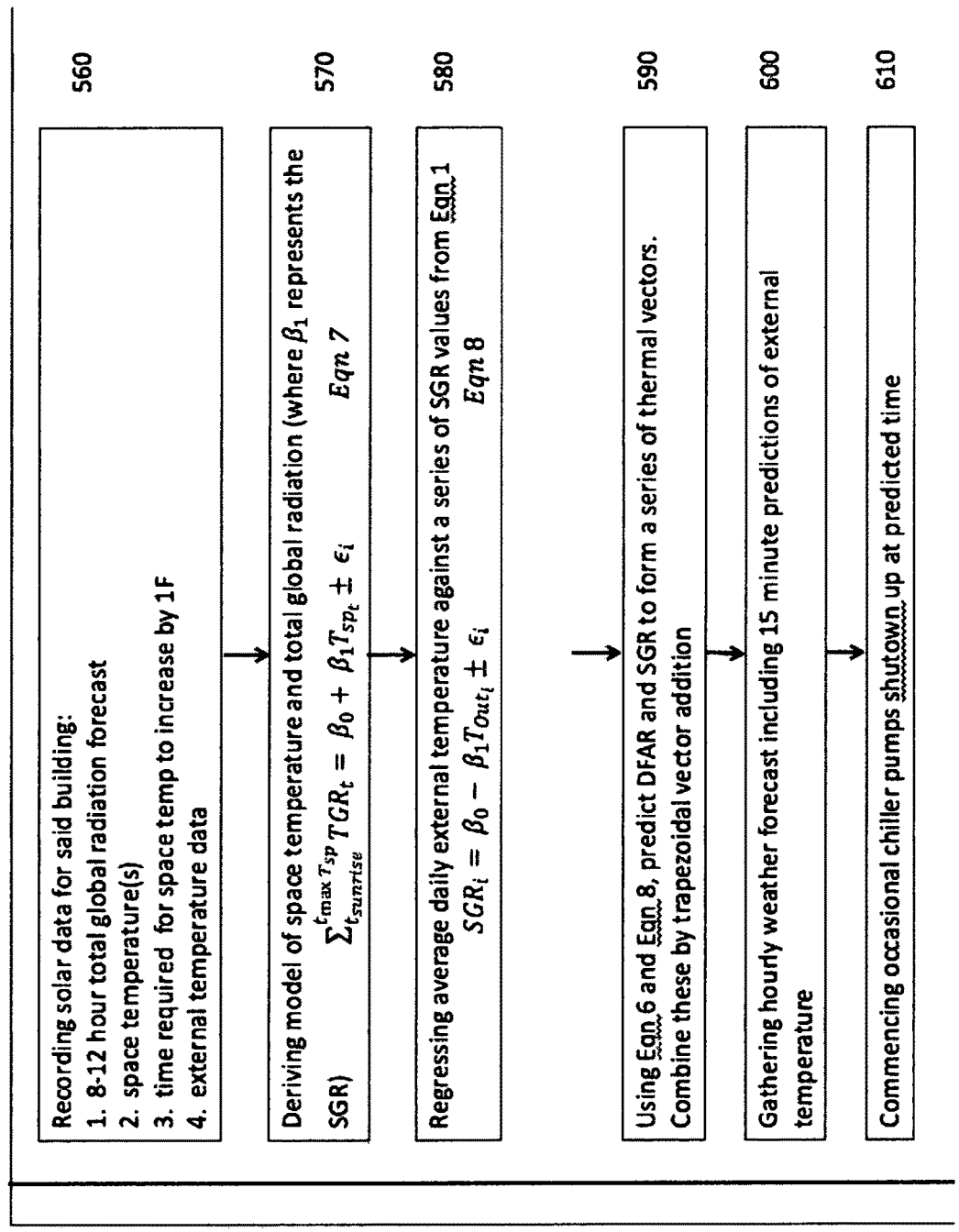
Figure 3F:
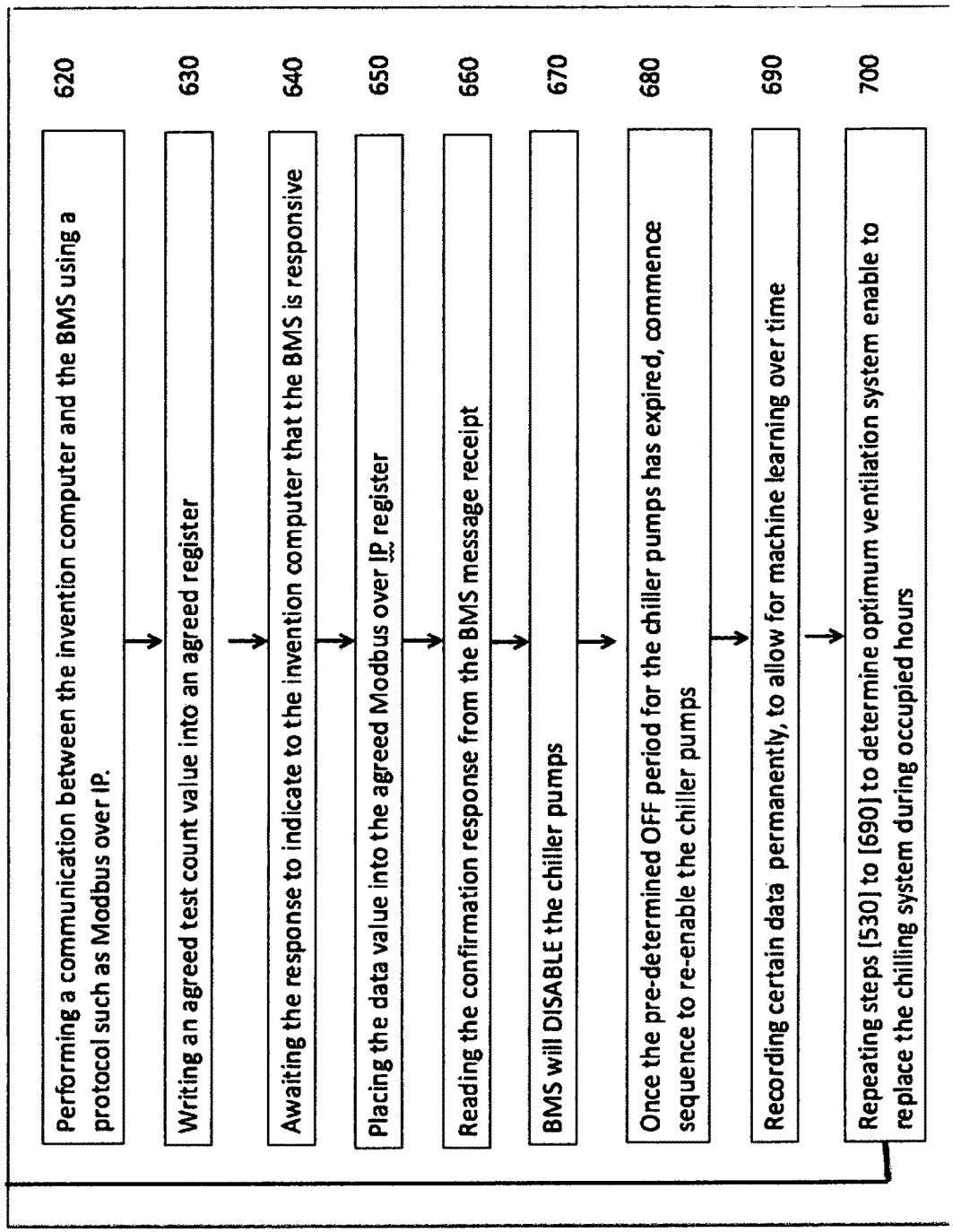

Method 2 steps are outlined in FIGS. 3D to 3F and are explained in the following section.

Method to determine suitable periods of daytime forced air replacement for chilled air space cooling during times of occupancy a) Selecting [500] a suitable open plan area or space within a selected commercial building or a series of suitable open spaces in which to observe the space temperature(s);

b) Determining [510] the internal building space set-point for the current cooling season. This is usually set at approximately 70-72° F. This is simply read off the building management system computer screen c) Determining [520] suitable daytime periods (from weather forecast) when the external temperature is generally below 65° F., relative humidity of less than 60%, building is unoccupied and little or no Solar Activity. Disable chiller pumps and enable the operation of the ventilation system when these conditions are met d) Recording [530] the following data by observation during this ventilation system operating period in the said building:
1. space temperature(s) for the chosen open plan location(s) in 15 minute intervals from the time of chilled water pump disable until the space temperatures reach an average of 70-71° F.
2. simultaneous real-time external temperature in 15 minute intervals
3. relative humidity in 15 minute intervals e) Deriving [540], using this recorded data when forced ventilation is enabled, a regression model to show how the daytime internal space temperature changes as a function of the difference between that space temperature and the hourly average external temperature for each cooling day using an equation:

$$T_{VSPi} = \beta_0 - \beta_1(T_{VSPi} - Tout_i) + \epsilon_i \quad \text{Eqn 5}$$

wherein $T_{VSPi}$ is the ventilated internal space temperature recorded at time period i β₀ represents the intercept of the linear relationship between the ventilated internal space temperature and the difference between the ventilated internal space temperature and the external real-time temperature, on the y-axis β₁ represents the slope of the relationship between the ventilated internal space temperature $T_{VSPi}$ and the difference between that temperature and the real-time temperature $Tout_i$ at time period i $Tout_i$ is the value of real-time external temperature, observed for any given time period i ε represents the variability in the linear model f) Deriving [550] a relationship by: The slope of this linear relationship β₁ is the DFAR for this particular daytime period. The slope is recorded for each hour.

This yields a series of $DFAR_{i=1...N}$ values for one hour periods 1 ... N when untempered forced air ventilation has replaced chilled air cooling. This is shown in generalized form as follows:

$$DFAR_i = \beta_0 - \beta_1 ATout_i + \epsilon_i \quad \text{Eqn 6}$$

wherein $DFAR_i$ is the derived daytime forced air replacement on any given hour long period i, on which the cooling system is usually operating, but is replaced by untempered forced air ventilation β₀ represents the intercept of the linear relationship between DFAR and daily average real-time external temperature on the y-axis β₁ represents the slope of the relationship between $DFAR_i$ and daily lagged average external temperature $ALaggedTout_i$ $ALaggedTout_i$ represents the value of daily average lagged external temperature guided by the natural thermal lag calculated for any given day i ε represents the variability in the linear model g) Recording [560] solar data for the selected building during periods of solar activity, non-operating mechanical plant and low to zero occupancy by recording the following data:
1. actual total global radiation
2. space temperature(s) for the chosen open plan location(s) at sunrise
3. time required for the chosen open-plan location(s) space temperature(s) to rise by 1° F.
4. external temperature data in 15 minute intervals
5. Record these internal and external temperatures until the internal space temperature stops rising h) Deriving [570], using this recorded data, a regression model to show how the internal space temperature(s) change(s) as a function of Total Global Radiation for each heating day using the generalized equation:

$$\sum_{t_{sunrise}}^{t_{maxT_{sp}}} TGR_t = \beta_0 + \beta_1 T_{sp_t} \pm \epsilon_i \quad \text{Eqn 7}$$

wherein $$\sum_{t_{sunrise}}^{t_{maxT_{sp}}} TGR_t$$

is the accumulating value of Total Global Radiation as recorded and accumulated on a 15 minute basis, over a time period from sunrise ($t_{sunrise}$) to when the internal space temperature reaches its peak value ($t_{max\,T_{sp}}$)

β₀ represents a y-axis intercept of the linear relationship between the accumulating Total Global Radiation and internal space temperature β₁ represents a slope of a linear relationship between the accumulating Total Global Radiation and internal space temperature $T_{sp_t}$ represents a value of internal space temperature as measured at time t ε represents the variability in the linear model.

i) Determining [580] the Solar Gain Rate (SGR) of spaces within this building by relating the slope of the linear relationship in Eqn 7 to the average external temperature recorded from sunrise to when the internal space temperature reaches its' maximum point. Repeat the process outlined in d) and e), recording each average daily external temperature from sunrise to the time of maximum space temperature and the slope of the regression relationship pertaining to that particular day, or SGR. In this regression model (Eqn 1), the slope $\beta_1$ will be referred to as the SGR.

This yields a series of $SGR_{i=1 \ldots N}$ values for heating days 1 ... N. A relationship can be established which links the SGR to the average daily average external temperature. This relationship takes the general form of:

$$SGR_i = \beta_0 - \beta_1 T_{Out_i} \pm \epsilon_i \qquad \text{Eqn 8}$$

wherein $SGR_i$ is the slope of the relationship in Eqn 1 derived for each day i under examination $\beta_0$ represents the intercept of the linear relationship between the Solar Gain Rate and the averaged external temperature from sunrise to the maximum value of the internal space temperature, on the y-axis $\beta_1$ represents the slope of the linear relationship between the accumulating Solar Gain Rate and the average external temperature $T_{Out_i}$ represents the averaged external temperature as measured from sunrise to the time of maximum internal space temperature on day i $\epsilon$ represents the variability in the linear model.

j) Using [590] the relationships formed in Eqn 6 and Eqn 8, take the predicted rise and/or fall of internal space temperature(s) during the period when the ventilation system is operational to form two resulting thermal vectors. Apply either the trapezoidal or triangular method of vector addition to yield a resultant prediction of how the building space temperatures will respond due to daytime forced air replacement combined with solar activity k) Gathering [600] the hourly weather forecast to include 15 minute predictions of external air temperature, solar activity and relative humidity for the following 8-12 hours, ensuring the forecast extends beyond the estimated natural thermal lag of the commercial building in question during the cooling season. Using this forecast in conjunction with Eqns 5-8 to predict suitable times when the untempered external air can be effectively used to cool the building. This is achieved by disabling the cooling or chilled water pumps during these suitable periods l) Commencing [610] occasional chiller pumps shutdown at the predicted time m) Performing [620] a communication between the invention computer and the BMS using a protocol such as Modbus over IP to disable the chiller pumps. For example, if the hex value of 0x0101 represents 'Chiller Pumps DISABLE' if placed in Modbus register 8076, as agreed with the BMS programmer n) Writing [630] an agreed test count value into an agreed register to ensure the BMS knows the inventive computing device is present and functional o) Awaiting [640] the response from the BMS, to indicate to the inventive computing device that the BMS is responsive p) Placing [650] the 0x0101 data value into the agreed Modbus over IP protocol register at the calculated chiller pumps off time q) Reading [660] the confirmation response from the BMS in another register to confirm to the inventive computing device that the instruction to disable the chiller pumps has been received r) Responding [670] to this writing of digital data (0x0101) into this register (8076), the BMS will turn the chiller pumps off s) Depending [680] on the results of the vector combination explained in step 590, it has been determined that the chiller pumps may be disabled for some period to avoid the use of chilled water in the ventilation system. Once this determined period has elapsed, a communication is commenced with the BMS from the inventive computing device to re-enable the chiller pumps t) Recording [690] permanently, the observed 15-minute interval data for weather forecast, internal space temperatures and all other relevant data used in the above equations to facilitate more accuracy in the data regression models, to effectively allow for machine learning over time u) Repeating [700] steps d) 530 to t) 690 at an appropriate time, as calculated, to determine an optimum off period for the chiller pumps to facilitate the use of suitable external environmental conditions to maintain the building at the desired internal space temperature parts of the cooling season.

Practical Use of the Method in Real Buildings

The method has been developed for practical implementation in real buildings. The majority of modern commercial buildings, be they office, retail, medical, educational, etc. are equipped with a building management system (BMS). The BMS is a computerized system which monitors vital parameters inside and outside the building and depending on the particular building-specific control strategy, the BMS will respond by switching plant on/off or if the plant has variable control, increasing/decreasing the level of output. Because of the need for high levels of reliability, availability and serviceability, most BMS are highly distributed in nature, meaning that one section of the BMS is completely independent of the others. This removes the risk of single points of failure in the overall system. The BMS hardware architecture therefore consists of control points (referred to as out-stations) which are autonomous but network connected. Each of these out-stations might monitor such things as several space temperatures and control multiple heating and cooling devices, in response to these monitored readings. The overall collection or framework of out-stations, monitors and controls go to make up the BMS. There are many manufacturers of these systems throughout the World; the largest might include companies such as Siemens (GR), Honeywell (US), Johnson Controls (US) or Trend (UK).

The most common form of communications within the BMS framework is a low level protocol called ModBus. This protocol was developed within the process control industry (chemical plants, oil refineries, etc.) and it dates from the earliest forms of computer control. The implementation concept of ModBus is that of addressable registers which are either readable, writable, or both. The easiest way to imagine the implementation is that of pigeon-holes. So with this protocol, it is possible to use a computer device, equipped with a ModBus hardware interface, to request the reading of a register (say register 8002) which might represent some space temperature (value can vary between 0000 and FFFF (in Hexadecimal) which, let's say, represents a temperature range of 0° F. to +200° F.). On reading this space temperature, the algorithm in the connected computer can now determine the response, so if the reading is 0x5EB8 (representing 74° F.), the computer might request that the heating valve be lowered and this is done by writing a new value to another register, say register 8006. The BMS will interpret this value and act accordingly. This assumes, of course, that the BMS is set up or programmed to monitor these registers and act accordingly. This protocol must be agreed with the BMS programmer in advance so that both sides of the ModBus registers are aware of the meaning and mapping of register addresses and values.

Physical Connections

In the practical implementation of this system, the physical connection to the BMS is normally achieved over an industry-standard Internet Protocol (IP) network. This is the same type of network installed in a standard office or commercial building. Much development has been done by the BMS manufacturers in recent years to get the BMS protocols, such as ModBus, to function over a standard Ethernet or IP network. This has led to ModBus over IP. If a new computer, such as the invention computer, is introduced to this Modbus over IP network, the new computer is simply assigned an IP address by the network administrator and thereafter, that computer can issue read and write commands over IP, once the map of registers is known to the new computer. As mentioned, this map is known to the BMS programmer, so the introduction of the new computer would preferably happen with the knowledge and agreement of the BMS programmer. The BMS programmer may assign certain rights and privileges to the new computer thus dictating what it can read and what it can control by register writes. A typical configuration is shown in FIG. 4.

Figure 4A:
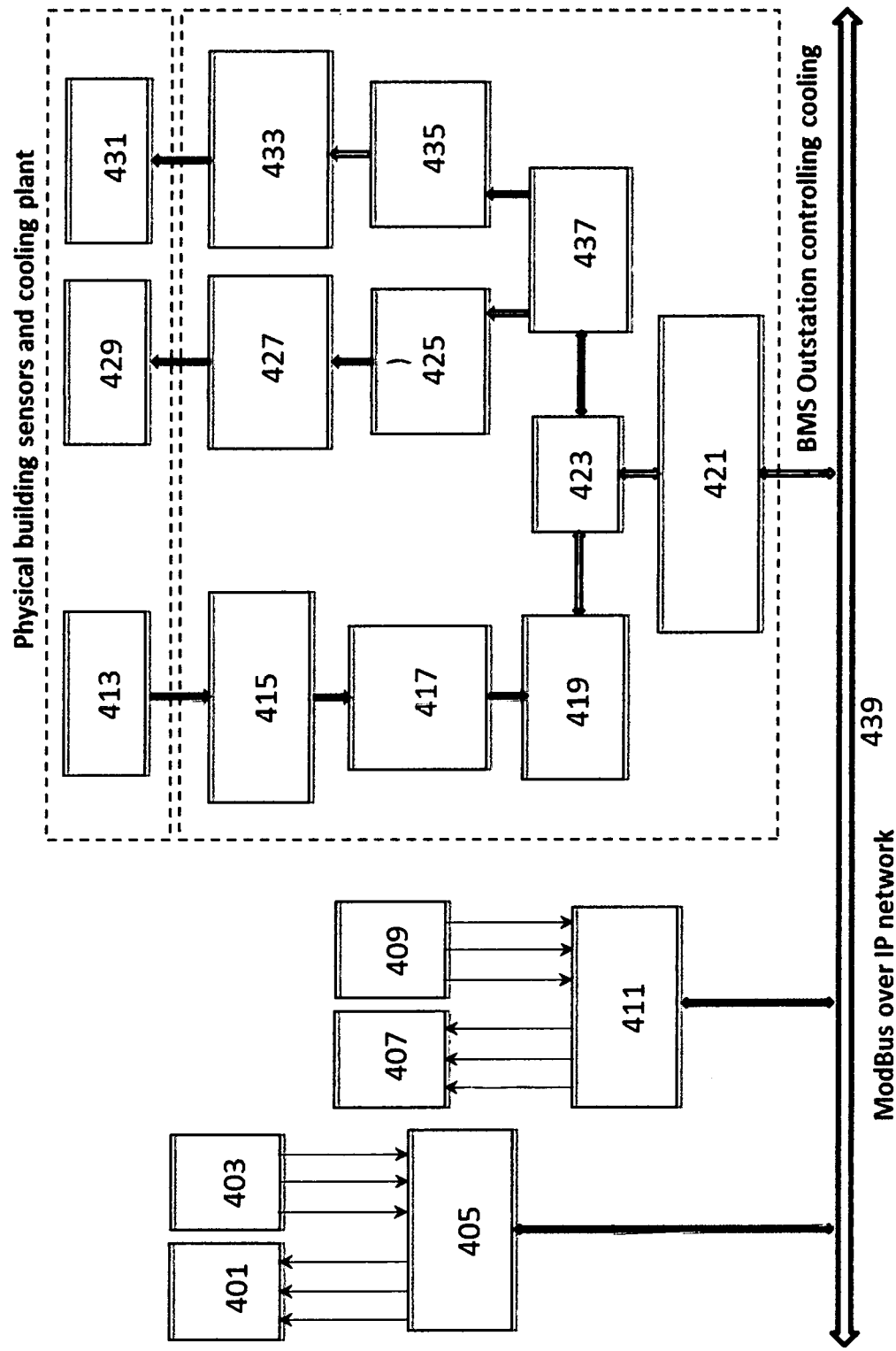

The following blocks are contained in FIG. 4a:

Control Outputs to Boiler [401]; Status inputs from boiler [403]; BMS Out-station controlling; heating [405]; Control outputs to AHU [407]; Status inputs from AHU [409]; BMS Out-station controlling fresh air supply [411]; Physical temperature sensor [413]; 0-10v input connected to $1^{st}$ floor ceiling temperature sensor [415]; $1^{st}$ floor space temperature Register 8002 (read/only) [417]; Modbus Register Read Control [419]; Out-station control strategy logic and Modbus interface manager [421]; Modbus Register Map [423]; Chiller Enable Register 8018 (write/only) [425]; Digital signal 0-5v where 5v represents Chiller Enable [427]; Physical chiller or AC plant [429]; Physical chiller pump speed control [431]; 0-10v output to the variable frequency chiller pump control [433]; Chilling pump speed control Register 8020 (write/only) [435]; Modbus Register Write Control [437]; Modbus over IP network [439]

Figure 4B:
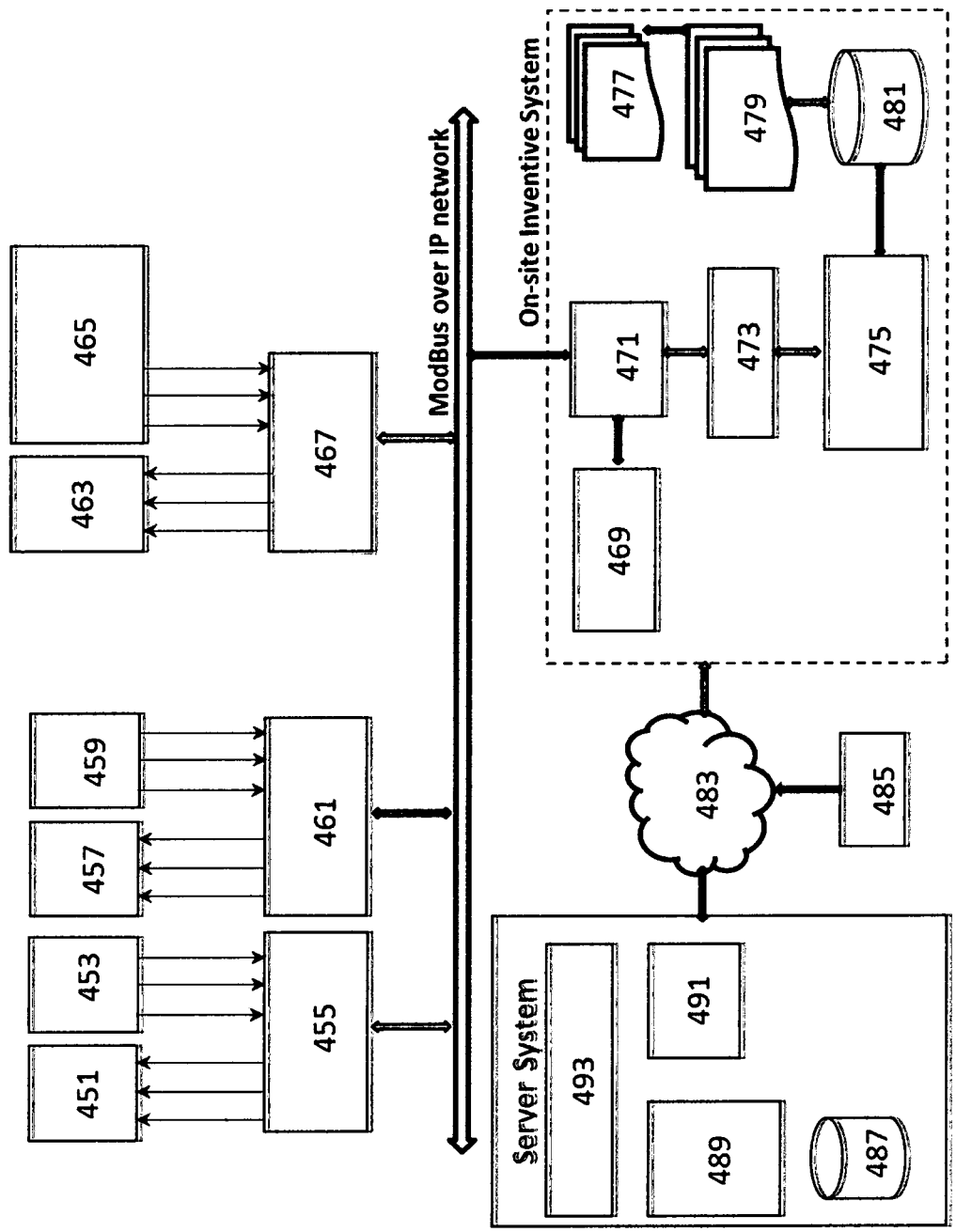
Figure 6:
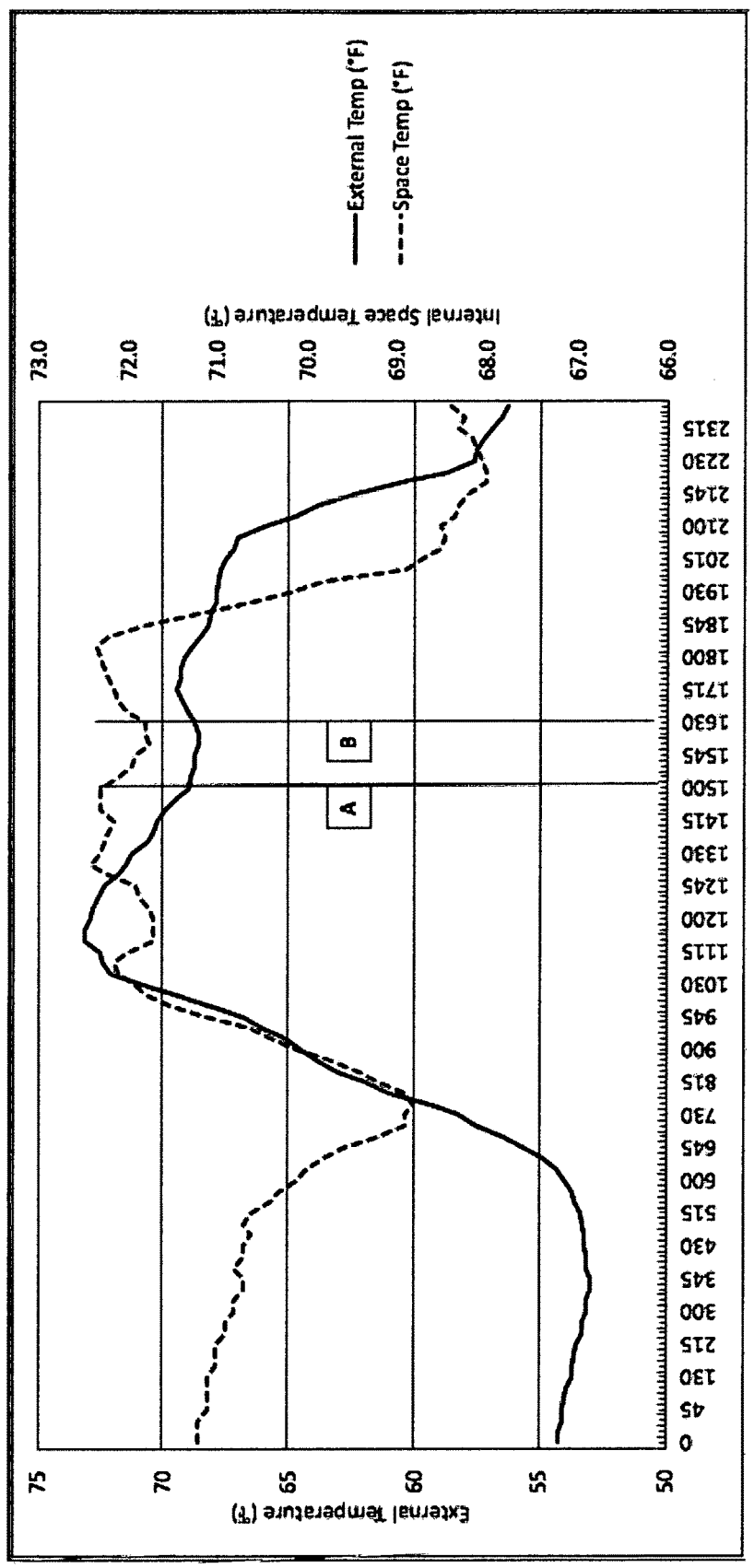
Figure 9:
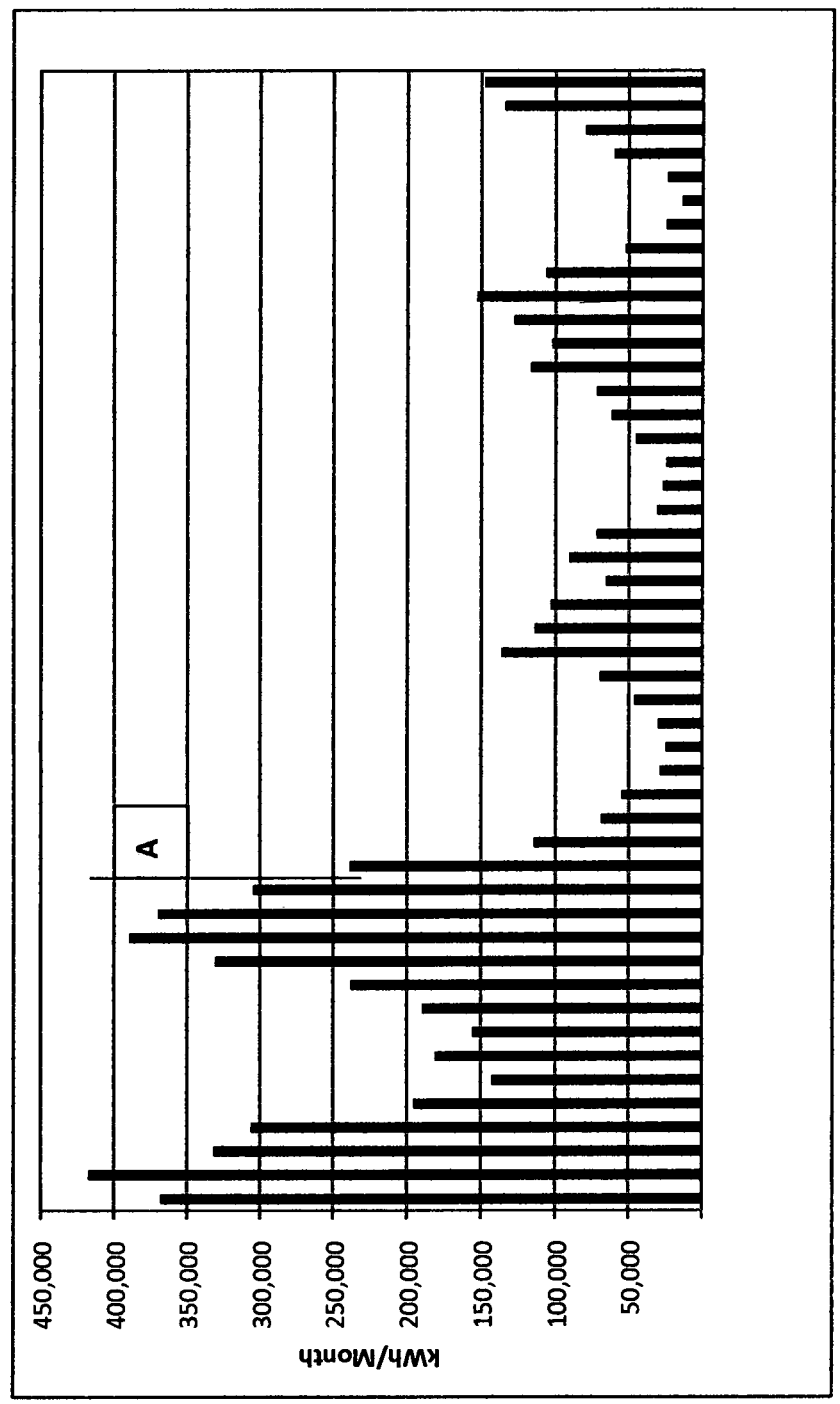

The following blocks are contained in FIG. 4b:

Control Outputs to Boiler [451]; Status inputs from boiler [453]; BMS Out-station controlling heating [455]; Control outputs to AHU [457]; Status inputs from AHU [459]; BMS Out-station controlling fresh air supply [461]; Control outputs to cooling system [463]; Status inputs from physical cooling system and space temperature sensors [465]; BMS Out-station controlling cooling [467]; BMS Connection Live StatusMonitor [469]; Modbus interface manager [471]; BMS Interface manager [473]; NTL, OFVR, DFAR, SGR and NNCPS calculation algorithms [475]; Schedule Files [477]; Temperature set-point files [479]; Database [481]; Internet or some IP public network [483]; Weather forecast generator [485]; Server Database [487]; Status Reporting Web Service [489]; Cooling system optimizer [491]; Cloud-based replica of on-site system algorithms [493]

Control Strategy and Protocol

The control strategy is agreed with the BMS programmer and the register mapping is shared between the BMS and the new computer system. This allows the new computer device to read and write certain registers. As an illustration, let's say, the computer device reads all internal space temperatures and the BMS external temperature. With this data, the computer device can calculate the natural thermal lag for the building over a one day period. With these space temperature data and knowledge of the start and stop times for the cooling system, the computer device can calculate the mechanical space cool-down rate (MSCR) and night-time natural cool-down profile slope (NNCPS) which according to the MSCR and NNCPS algorithms explained in this specification, can result in the computer device writing to the cooling plant ON register to enable the chillers or air conditioning plant. In this way, the computer device can influence the cooling control strategy by bringing forward or pushing back the mechanical cooling start-up time. In a similar fashion, the calculation of the day-time natural heat-up rate (DNHR) can be completed as shown in this specification. This facilitates the identification of suitable OFF periods for the cooling system either during the occupied times of the day or at the end of the working day. These OFF periods are specifically identified to not adversely affect occupant comfort levels by maintaining a very tight range of space temperatures.

Several interlocks can be implemented between the computer device and the BMS. These ensure that the BMS knows the computer device is functional. If for any reason, the computer device fails to respond to the regular 'are you alive' request from the BMS, the BMS will revert to the stored control strategy and its default operational schedules. In this way, in the event of computer device or communications failure, no down time should be experienced by the BMS or the building.

Proof of Concept: Test Building Implementation of this Method

The method involving the various lags and profiles was implemented in a building in Western Europe. This building has been referred to as the test building or B1. B1 is a single-tenant premium office building located at a city-center business park. Arranged as six floors over basement carpark, it comprises almost 11,000 m$^2$ of usable office space (approximately 120,000 sqft) and is concrete constructed with columns and cast in-situ flooring slabs. The building would be considered a heavy building unlike a more conventional steel-framed building and with that weight comes a larger thermal mass—slow to heat up and slow to cool down. All lag calculations were performed manually in preparation for their implementation in an automated computerized system.

Commencing with the establishment of an energy usage benchmark or baseline, the various lags and profiles were observed during the first month without any energy efficiency interventions. During this time, several open-office spaces were monitored and the internal and external temperatures were recorded. This data provided guidance for the initial assessment of how the lags might be successfully applied to the operation of the building plant. Note that the lags and lag profiles have been developed as (1) high level indicators of building envelope thermal performance and (2) indicators of how the building envelope interacts with the installed plant. In the B1 building, they have been used to guide reduced plant operations specifically to generate better energy efficiency in the use of plant to provide agreed levels of occupant comfort.

The following sections outline the baseline establishment, the specific actions taken as a result of the lag calculations and finally, the results of this implementation are described.

P1 Energy Baseline

Before the energy reduction programme commenced, an energy usage baseline was agreed with the B1 building operator. After the operator had carefully considered the previous and following year's energy usage data and the weather experienced during these years, the figures from a typical full calendar year were selected as the most indicative of reasonable annual energy use. FIG. 5 shows the various agreed baseline energy loads in B1 over the course of this year.

Please note that all units used in the implementation of the method for the B1 building and reported here are S.I. or metric units as that what is now customarily used in Europe by building and design personnel. Where possible, the equivalent units from the US Customary system have also been included.

Identifying Energy Reduction Opportunities

Prior to April 2011, the B1 building was operated on a full 24/7 basis with all plant enabled to run most of the time. The BMS schedules, together with the control strategies and the daily space temperatures available on the BMS, were analysed in detail to determine the best opportunities for energy reduction. The following section outlines the conclusions reached from this analysis.

In order to determine the building's actual operational hours, it was suggested to security staff that an informal log might be kept of approximate staff numbers using the building late at night and over the weekends. These observations, over a two month period, showed that the building was lightly used overnight and at weekends, varying between 10 and 25 people at any time at weekends.

B1 Overheating

Prior to the commencement of the efficiency program, the amount of thermal energy being driven into the building from the B1 boilers far exceeded the tabulated average values from the CIBSE design and operation guidelines. According to CIBSE Guide A, thermal energy input to an office building should be in the vicinity of 210 kWh/m$^2$/yr for typical usage and 114 kWh/m$^2$/yr for good practice usage. B1 was consuming 347 kWh/m$^2$/yr during the course of 2010, based on a usable office space figure of 9,350 m$^2$ (approximately 100,000 sqft).

Likewise, electricity usage numbers were 350 kWh/m$^2$/yr, while the CIBSE usage guideline for typical office buildings was 358 kWhr/m$^2$/yr and 234 kWh/m$^2$/yr for good practice office buildings. The energy usage figures from CIBSE for typical office, good practice office and actual baseline year are shown in FIG. 7.

B1 Over-Chilling

Once the overheating issue was identified, the amount of chilling going into B1 also came under scrutiny. It was suspected that the over-heating of the building had a direct effect on the amount of chilling demanded by the individual fan coil units (FCU) on all floors. The BMS schedules for heating and chilling were examined and found to be running close to 24 hours per day.

It was reasonable to assume that the chiller schedule, starting at 2 am, was set up to avoid overheating during the early morning hours. If overheating could be reduced, the amount of chilling required might also be reduced.

B1 Oversupply of Fresh Air

The air handling units (AHU) were scheduled to run on a 24/7 basis. Given the B1 boilers were similarly scheduled, this meant the building was being supplied with tempered air at all times. Again an energy reduction opportunity presented itself based on the recommended fresh air flow in CIBSE Guide A at between 6 and 15 l/s/person (liters/sec/person), depending on the design parameters. This is almost identical to recommendations in ASHRAE Standard 55 for buildings in the USA. The four AHUs in B1, operating at full power, can deliver 28,000 l/s into the building. Significant losses in airflow are inevitable in the long non-linear ducts between AHU and office vents, but from the ventilation design, the fresh air supply is well in excess than that required for the current 500 occupants. The designers would have sized the AHUs for a maximum number of occupants, particularly in meeting rooms and open areas, such as the restaurant. With a reduced staff count at weekends, a reduced airflow is also possible. With the AHUs installed in B1, there was no mechanism to reduce the fan speeds—they are either on or off.

Changing B1 BMS from Demand Driven to Schedule Driven Operation

When first analysed, the BMS was found to have been programmed as a demand-driven system. The underlying assumption is that heating and cooling were available from the main plant at all times and one relies on the correct functionality of the local FCUs to use the heat and cooling resources as required.

One of the potential drawbacks of demand driven systems can manifest itself if FCUs are left permanently on or are malfunctioning. There is a possibility that a heating and/or cooling load could always exist, whether the space is in use or not. In any case, the fact that the boiler or chiller is enabled overnight will create a load just to keep these systems available in standby.

It was recognised early in the efficiency program, that substantially better control could be achieved if the BMS was changed from demand driven to time schedule driven. This would allow observation and confirmation of occupant comfort temperature compliance given various small and incremental changes to the delivered environment. In changing to a time schedule control strategy, a much finer level of control would be available and it would be possible to lower the amount of the heat delivered to B1 in a controlled manner. It was hoped the amount of chilling required by B1 could also decrease with the smaller amount of delivered heat. The calculation of the various lags and profiles were facilitated by this change from a demand to a schedule driven BMS strategy. The changes to plant operations suggested by these lags and profiles could also be more easily implemented with a schedule driven system.

Summary of B1 OFVR, NNCPS and DFAR, SGR Statistical Models

Following data collection from existing sources such as the BMS, newly installed monitoring equipment and observation, the overnight forced ventilation rate, night-time natural cool-down profile slope, daytime forced air replacement and solar gain rate models were derived from this data. Data mainly comprised local external temperature and global radiation (sunshine), internal space temperatures and $CO_2$ levels (various) and energy usage by plant type (chiller). These data proved sufficient to complete the profile model calculations as indicated in FIG. 8.

Implementation of Energy Reduction Programme

The practical application of the material contained in this specification to the B1 building forms part of an overall energy efficiency program. Many measures were implemented simultaneously or following each other over a comparatively short timescale. This was done as it would prove commercially impossible to separate out all of the individual measures and accurately report on the reduction effects of each one. For this reason, the figures showing the energy usage reduction in the following sections are for the complete program, rather than just the implementation of the material contained in this specification. However, the use of the overnight forced ventilation rate and the daytime forced air replacement both contributed to the dramatic changes in energy efficiency in the heating of the B1 building.

The energy reduction programme has primarily focussed on the large plant and equipment. The first interventions concern the heating, chiller and ventilation schedules.

Figure 10:
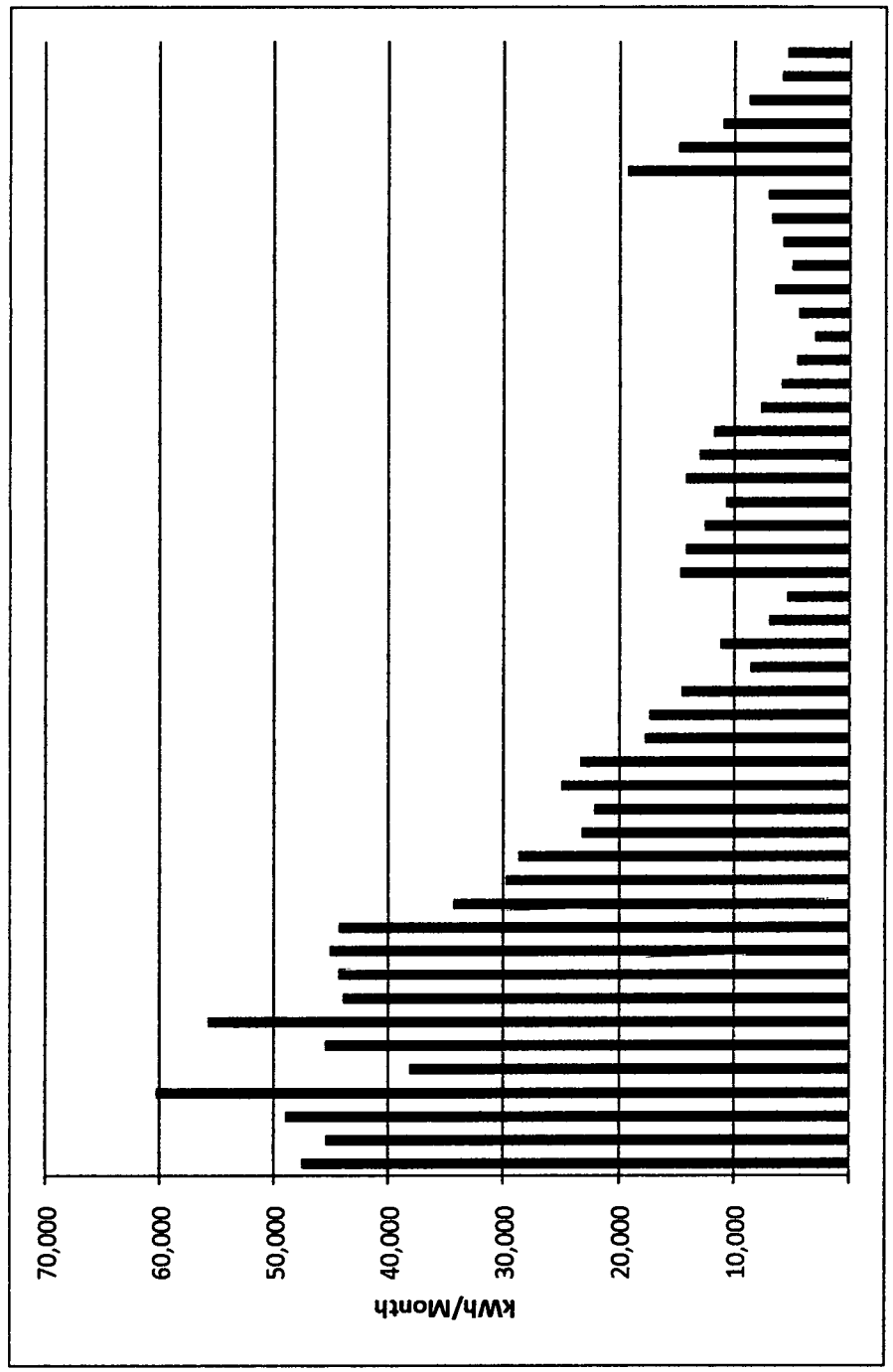
FIG. 10 Total chilling delivered to B1—over a four year period FIG. 11 Annual energy use outcomes for P1 over the four year period FIG. 12 Comparison of electricity and gas equivalent usage over calendar baseline year versus year 3

It is evident from the monthly usage figures in FIG. 10 that chilling was dramatically reduced soon after interventions commenced.

FIG. 11 shows the improvement in electricity usage due to the implementation of the efficiency program. Usage reduction, which is almost entirely attributable to cooling, has dropped from typical CIBSE usage to below CIBSE Good Practice levels.

FIG. 12 shows the monthly comparison usage figures for total electricity usage comparing the benchmark year with a year at the end of the efficiency program.

Results of the Energy Reduction Programme

A number of important changes in BMS schedules and set-points resulted in reductions in energy use in B1 which will be enumerated in this section. The analysis of heating and chilling patterns guided by the mechanical heat and cooling lags and the equivalent natural cooling lags, were also instrumental in identifying the inefficiencies which caused B1 to be over-supplied with both heat and chilling.

Conclusion

The savings achieved in B1 represent an overall saving of 54% based on a direct comparison of total energy consumption figures over a three year period from before and after the energy efficiency program. It is clear that B1, as with many other buildings that have been examined, that substantial overheating was the norm. This in turn, caused substantial overcooling to compensate. Both heating and cooling are expensive services in any western country and they should be limited to what is required for the building to provide a good working environment to occupants. When considering the quality of the thermal environment of any commercial building, there is nothing to be gained from overheating or overcooling.

Building plant has been sized to cater for the worst weather conditions and the maximum number of occupants. Whether these maximum conditions are ever met, is unclear, but equipment such as chillers, air handling units and boilers are very large consumers of power and gas and as such, they need to be controllable, with their operational times adjusted regularly to ensure no overheating or under-heating is occurring.

The method described in this document, along with the lags described in publication number 2013-0304269 A1 and publication number 2015-0198961 A1 were applied to this building. This application resulted in substantial improvement and reduction of energy usage, while preserving the delivery occupant comfort, and in certain respects, such as air quality, improving it.

The invention claimed is:

1. Method of controlling night time ventilation system in a commercial building to conserve energy, said method comprising the steps of:
   a) determining a natural thermal lag of said building;
   b) selecting at least one open space in said building and determining a temperature set point;
   c) enabling building ventilation system if external weather conditions satisfy pre-determined conditions;
   d) recording solar data for said building;
   e) deriving internal space temperature changes as a function of differences between internal space temperature and real-time external temperature for each day by $$T_{SPi} = \beta_0 - \beta_1(T_{SPi} - Tout_i) + \epsilon_i$$

wherein
   $T_{SPi}$ is internal space temperature recorded at time period i, and
   $\beta_0$ is a y-axis intercept of internal space temperature and differences between an internal space temperature and external real-time temperature, and
   $\beta_1$ is a slope of a relationship between internal space temperature $T_{SPi}$ and differences with respect to real-time temperature $Tout_i$ at time period i
   $Tout_i$ is a value of real-time external temperature at time period i, and
   $\epsilon$ is variability;

f) determining $$OFVR_i = \beta_0 - \beta_1 ATout_i + \beta_2 AVFD_i + \epsilon_i$$

wherein
   $OFVR_i$ is a derived overnight mechanical ventilation rate on day i, and
   $\beta_0$ is a y-axis intercept of overnight mechanical ventilation rate, OFVR and daily average real-time external temperature and variable frequency drive speed on a z-axis, and
   $\beta_1$ is a slope in the Y-direction of a plane forming a multiple linear regression relationship between two predictors $ATout_i$ and $AVFD_i$ and a response $OFVR_i$, and
   $\beta_2$ is a slope in a Z-direction of a plane forming a multiple linear regression relationship between $ATout_i$ and $AVFD_i$ and a response $OFVR_i$, and
   $ATout_i$ is a value of daily average real-time external temperature calculated for day i, and
   $AVFD_i$ is a value of daily average variable frequency drive fan speed calculated for day i, and
   $\epsilon$ is variability;

g) recording solar data for said building;
   h) calculating, using said data from g)

$$T_{SPi} = \beta_0 - \beta_1(T_{SPi} - LaggedTout_i) + \epsilon_i$$

wherein
   $T_{SPi}$ is an internal space temperature recorded at time period i, and
   $\beta_0$ is a y-axis intercept of the linear relationship between an internal space temperature and a difference between an internal space temperature and an external lagged temperature, and
   $\beta_1$ is a slope of a relationship between internal space temperature $T_{SPi}$ and a difference from an external lagged temperature $LaggedTout_i$ at time period i
   $LaggedTout_i$ is a value of lagged external temperature, for time period i, and
   $\epsilon$ is variability;

i) determining $$NNCPS_i = \beta_0 - \beta_1 ALaggedTout_i + \epsilon_i$$

wherein
   $NNCPS_i$ is a night-time natural cool-down profile slope on day i, and
   $\beta_0$ is a y-axis intercept between night-time natural cool-down profile slope,
   NNCPS and daily average lagged external temperature, and $\beta_1$ is a slope of a relationship between NNCPS$_i$ and daily lagged average external temperature ALagged-Tout$_i$, and ALaggedTout$_i$ is a value of daily average lagged external temperature on day i $\epsilon$ represents the variability in linear model, and j) calculating change in internal space temperature as a response to overnight mechanical ventilation;

k) calculating building ventilation start time, based on external weather forecast and results of step j); and l) controlling building ventilation system start-up at time determined by step k).

2. Method of controlling daytime mechanical air replacement for chilled air space cooling in a commercial building during times of occupancy, said method comprising the steps:

a) selecting, in a commercial building, at least one internal space to record temperature b) determining an internal building space set-point for a cooling season c) determining, using weather forecast, daytime periods for mechanical air replacement of chilling in said building d) recording solar data for said building e) determining $T_{VSPi} = \beta_0 - \beta_1(T_{VSPi} - T\text{out}_i) + \epsilon_i$ wherein $T_{VSPi}$ is a ventilated internal space temperature recorded at time period i, and $\beta_0$ is a y-axis intercept of a linear relationship between a ventilated internal space temperature and differences between a ventilated internal space temperature and external real-time temperature, and $\beta_1$ is a slope of a relationship between a ventilated internal space temperature, and $T_{VSPi}$ and differences from real-time temperature Tout$_i$ at time period i, and Tout$_i$ is a value of real-time external temperature at time period i, and $\epsilon$ is variability;

f) calculating $DFAR_i = \beta_0 - \beta_1 AT\text{out}_i + \epsilon_i$ wherein

DFAR$_i$ is daytime mechanical air replacement during period i, during which period a building cooling system operation is replaced is by untempered mechanical air ventilation, and $\beta_0$ is a y-axis intercept between daytime mechanical air replacement, DFAR and daily average real-time external temperature, and $\beta_1$ is a slope of a relationship between DFAR$_i$ and daily lagged average external temperature ALaggedTout$_i$, and ALaggedTout$_i$ is a value of daily average lagged external temperature for day i, and $\epsilon$ is variability;

g) recording solar data for said building during periods of solar activity, non-operating mechanical plant occupancy at less than approximately ten percent h) calculating $$\sum_{t_{sunrise}}^{t_{maxTsp}} TGR_t = \beta_0 + \beta_1 T_{sp_t} \pm \epsilon_i$$

wherein $$\sum_{t_{sunrise}}^{t_{maxTsp}} TGR_t$$

is an accumulating value of Total Global Radiation as recorded and accumulated on a 15 minute basis, over a time period from sunrise ($t_{sunrise}$) to time an internal space temperature reaches a peak value ($t_{maxT_{sp}}$), and $\beta_0$ is a y-axis intercept of a linear relationship between an accumulating Total Global Radiation and internal space temperature, and $\beta_1$ is a slope of a linear relationship between an accumulating Total Global Radiation and internal space temperature and $T_{sp_t}$ is a value of internal space temperature as measured at time t, and $\epsilon$ is variability;

i) determining $SGR_i = \beta_0 - \beta_1 T_{Out_i} \pm \epsilon_i$ wherein

SGR$_i$ is a slope of results of step e) derived for day i, and $\beta_0$ is a y-axis intercept between a Solar Gain Rate and an averaged external temperature from sunrise to the maximum value of an internal space temperature, and $\beta_1$ is a slope of a linear relationship between an accumulating Solar Gain Rate and an average external temperature, and $T_{out_i}$ is an averaged external temperature as measured from sunrise to a time of maximum internal space temperature on day i, and $\epsilon$ is variability;

j) calculating, from step f) and step i), a predicted change in internal space temperature during a period when said building's ventilation system is operational, forming two resulting thermal vectors, and applying vector addition to yield a resultant for said building space temperature response to daytime mechanical air replacement combined with solar activity;

k) obtaining weather forecast and calculating, based on results of step e), step f) step h) and step i) at what time untempered external air can be effectively used to cool said building, and at what time to shut-down chiller pumps; and l) using results of step k) to control time of shut-down of chiller pumps.

* * * * *